(12) United States Patent
Tomosugi et al.

(10) Patent No.: US 11,428,920 B2
(45) Date of Patent: Aug. 30, 2022

(54) INFORMATION PROCESSING DEVICE, INFORMATION PROCESSING METHOD, INFORMATION PROCESSING PROGRAM, AND MICROSCOPE FOR DISPLAYING A PLURALITY OF SURFACE IMAGES

(71) Applicant: NIKON CORPORATION, Tokyo (JP)

(72) Inventors: Wataru Tomosugi, Tokyo (JP); Sadashige Ishida, Tokyo (JP); Kazuhiro Abe, Tokyo (JP); Shutaro Onishi, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 17/106,777

(22) Filed: Nov. 30, 2020

(65) Prior Publication Data

US 2021/0132359 A1    May 6, 2021

Related U.S. Application Data

(63) Continuation of application No. PCT/JP2018/020865, filed on May 30, 2018.

(51) Int. Cl.
*G02B 21/36* (2006.01)
*G02B 21/00* (2006.01)

(52) U.S. Cl.
CPC ....... *G02B 21/367* (2013.01); *G02B 21/0032* (2013.01); *G02B 21/0072* (2013.01); *G02B 21/0076* (2013.01)

(58) Field of Classification Search
CPC .............. G02B 21/367; G02B 21/0032; G02B 21/0072; G02B 21/0076; G02B 21/06; G02B 21/16; G01N 21/6458

(Continued)

(56) References Cited

U.S. PATENT DOCUMENTS 9,347,852 B1 * 5/2016 DiMatteo ............. G02B 21/082
2005/0020876 A1 * 1/2005 Shioda ............... G02B 21/0012
600/101

(Continued)

FOREIGN PATENT DOCUMENTS

GB           2559157 A  *  8/2018  .......... G06K 9/6203
JP      2001-243500 A      9/2001

(Continued)

OTHER PUBLICATIONS

Keita et al, JP2001243500A, Machine English Translation of the Japanese document (Year: 2001).*

(Continued)

*Primary Examiner* — Heather R Jones
(74) *Attorney, Agent, or Firm* — Oliff PLC

(57) ABSTRACT

An information processing device comprises: an image processor which generates surface information from point cloud data generated on the basis of position information of an object, using a value of a first parameter and a value of a second parameter; and a display controller which causes a display to display a surface image on the basis of the generated surface information, wherein the image processor generates a plurality of pieces of surface information, using a plurality of values of the first parameter and a plurality of values of the second parameter, and the display controller causes the display to display a plurality of surface images on the basis of the plurality of pieces of generated surface information.

11 Claims, 26 Drawing Sheets

(58) Field of Classification Search
USPC .......................................................... 348/80
See application file for complete search history.

(56) References Cited

U.S. PATENT DOCUMENTS

| | | | |
|---|---|---|---|
| 2005/0054900 A1* | 3/2005 | Mawn ..................... | A61B 5/065 600/156 |
| 2005/0142608 A1* | 6/2005 | Uchida .............. | G01N 21/6458 435/7.1 |
| 2006/0265198 A1 | 11/2006 | Kanai et al. | |
| 2008/0182336 A1 | 7/2008 | Zhuang et al. | |
| 2012/0047462 A1* | 2/2012 | Moon ................ | H04N 21/4312 715/810 |
| 2012/0238877 A1* | 9/2012 | Tashiro ............... | G01S 7/52049 600/447 |
| 2013/0079599 A1* | 3/2013 | Holmes ................. | G16H 10/40 600/300 |
| 2015/0018622 A1* | 1/2015 | Tesar ..................... | A61B 90/20 600/202 |
| 2015/0313466 A1* | 11/2015 | Yoshida ................. | A61B 3/102 600/425 |
| 2016/0125596 A1 | 5/2016 | Jo et al. | |
| 2016/0150948 A1* | 6/2016 | Shimamoto .............. | A61B 1/07 600/109 |
| 2016/0379370 A1 | 12/2016 | Nakazato et al. | |
| 2017/0153436 A1* | 6/2017 | Park ....................... | G02B 21/33 |
| 2017/0161921 A1* | 6/2017 | Tian ....................... | G01B 11/00 |
| 2017/0251191 A1 | 8/2017 | Huang et al. | |
| 2018/0025548 A1 | 1/2018 | Endo et al. | |
| 2018/0299659 A1* | 10/2018 | Sase ................... | H04N 5/23293 |
| 2019/0311549 A1 | 10/2019 | Endo et al. | |

FOREIGN PATENT DOCUMENTS

| | | | | |
|---|---|---|---|---|
| JP | 2001243500 A | * | 9/2001 | ............. G01B 11/24 |
| JP | 2006-277713 A | | 10/2006 | |
| JP | 2017-010327 A | | 1/2017 | |

OTHER PUBLICATIONS

Aug. 28, 2018 International Search Report issued in International Patent Application No. PCT/JP2018/020865.

Dec. 1, 2020 International Preliminary Report on Patentability issued in International Patent Application No. PCT/JP2018/020865.

Oct. 26, 2021 Japanese Office Action issued in Japanese Patent Application No. 2020-522487.

* cited by examiner

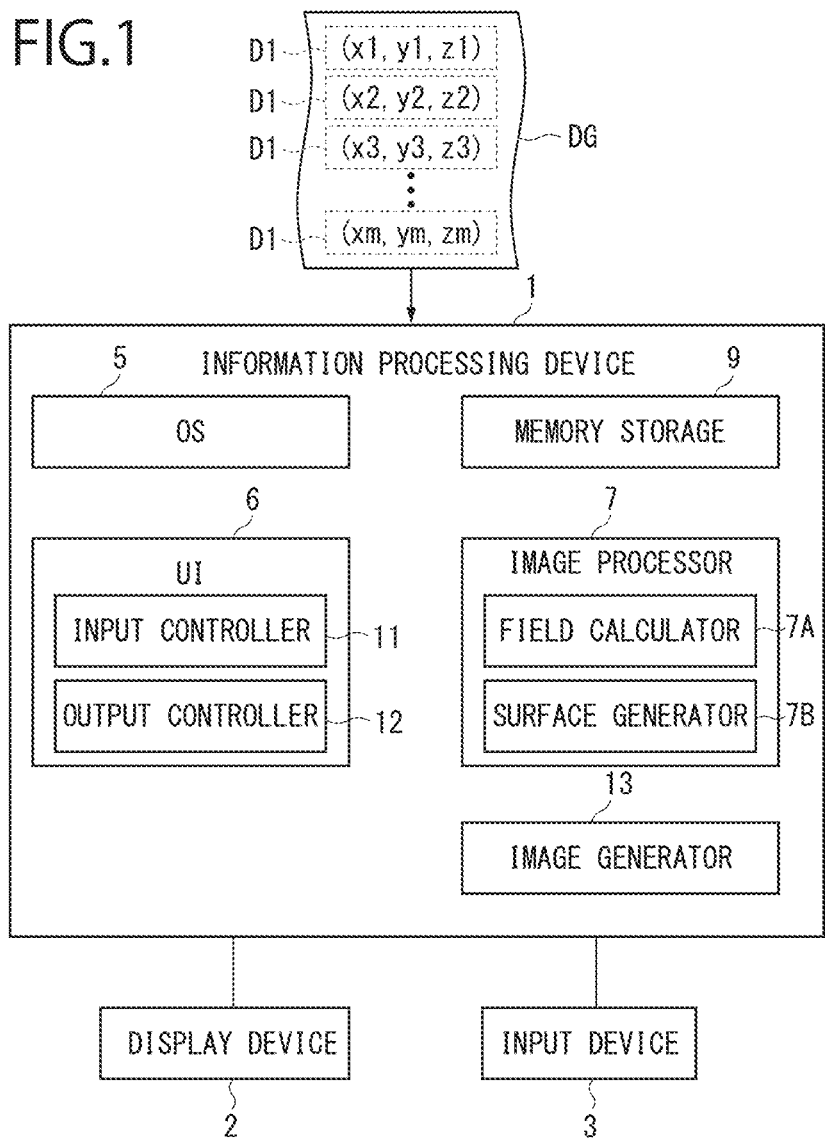

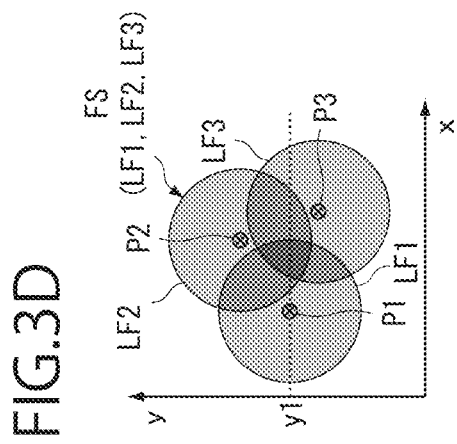 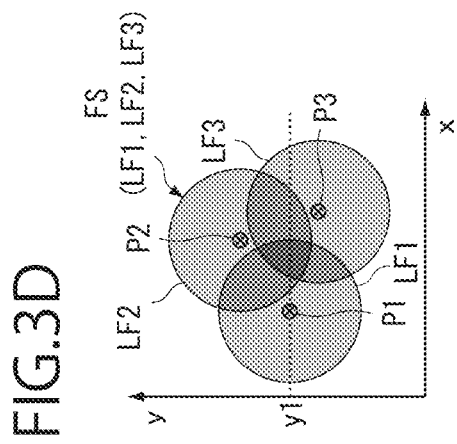 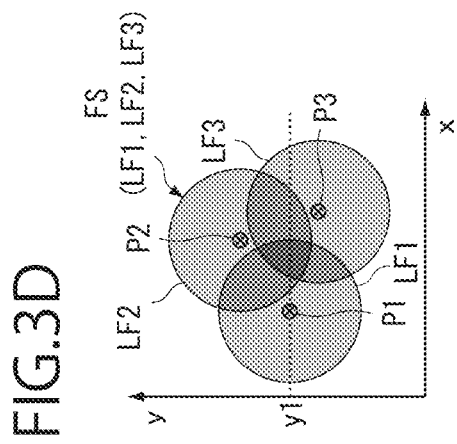 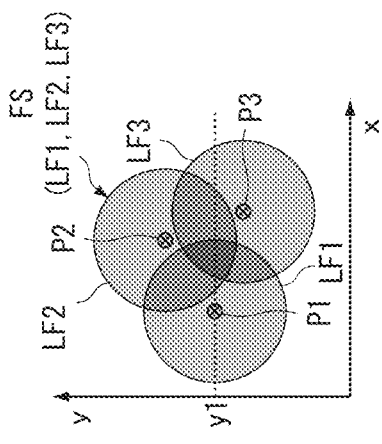
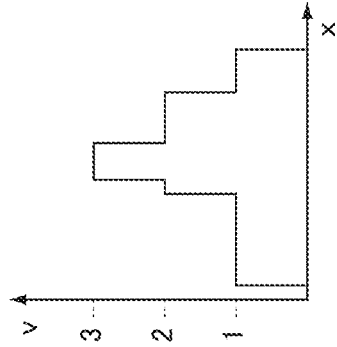 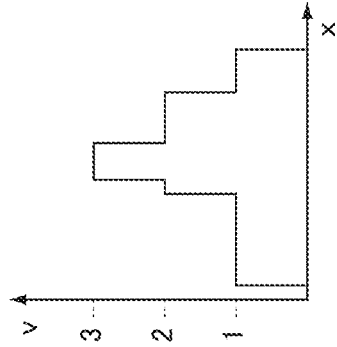 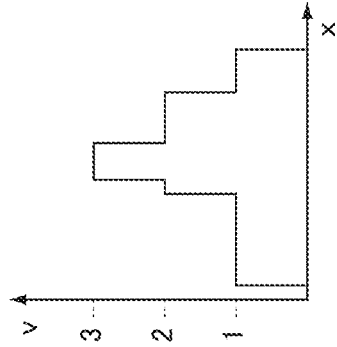 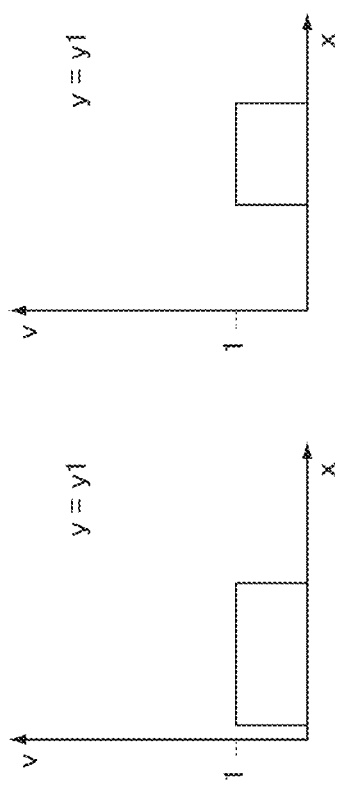
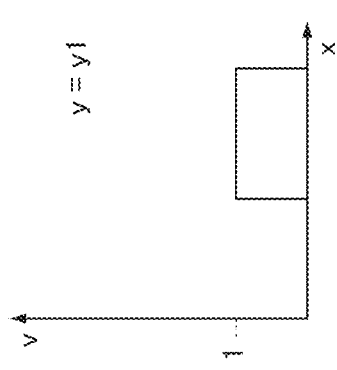 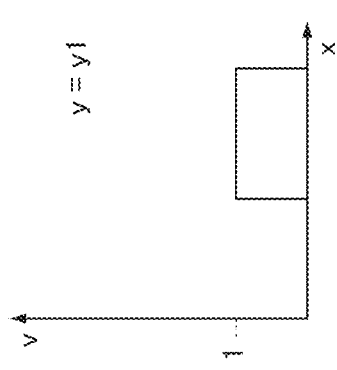 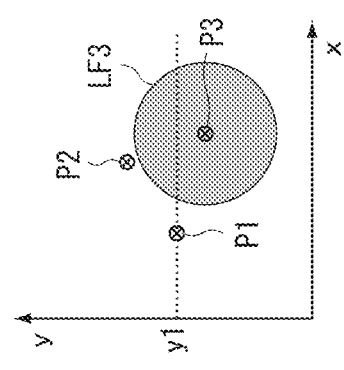 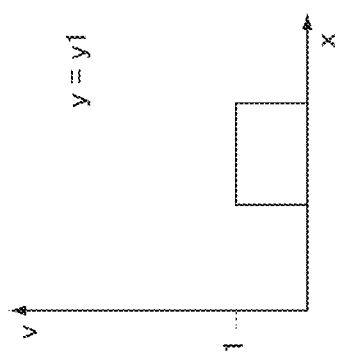
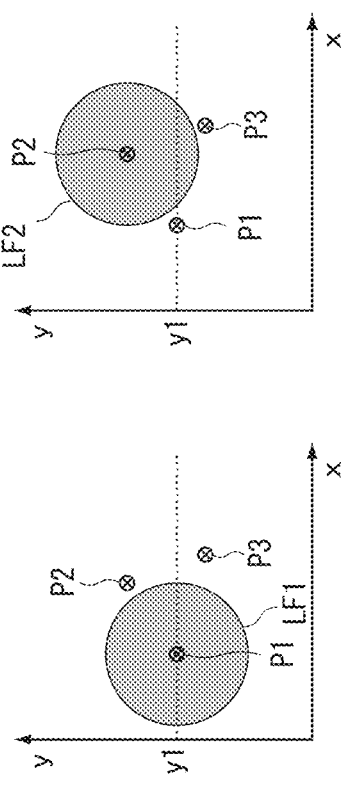
FIG.3A  FIG.3B  FIG.3C  FIG.3D

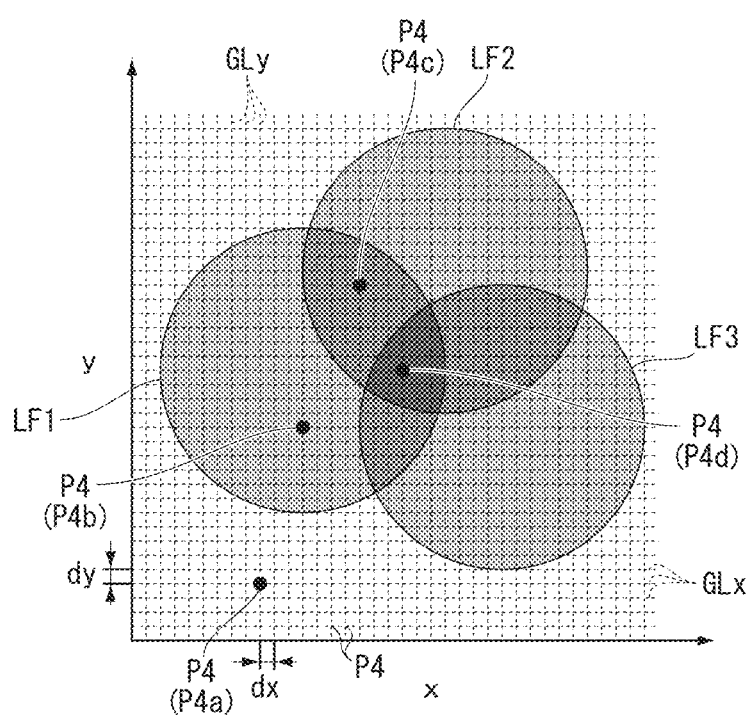

FIG.10A
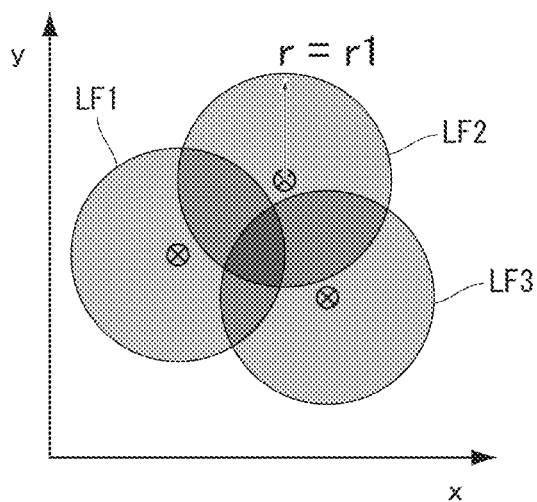
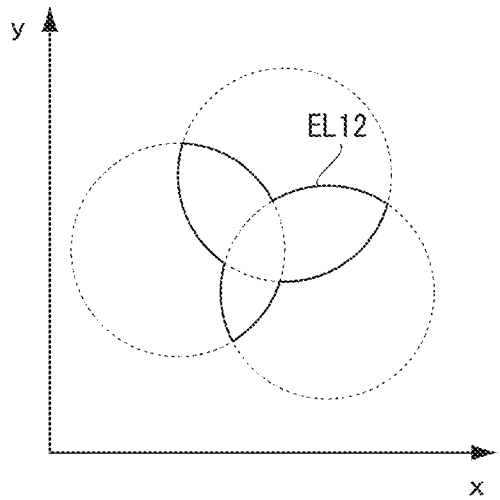
FIG.10B
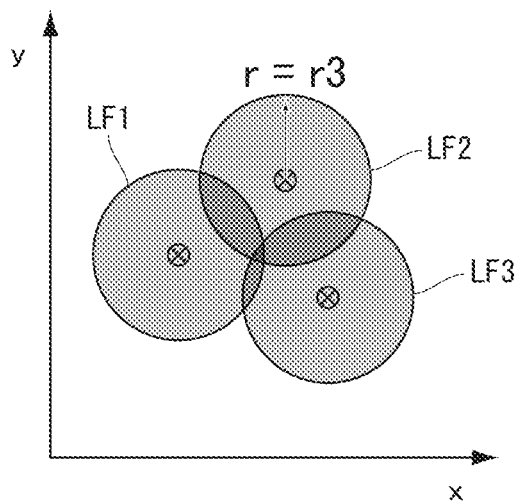
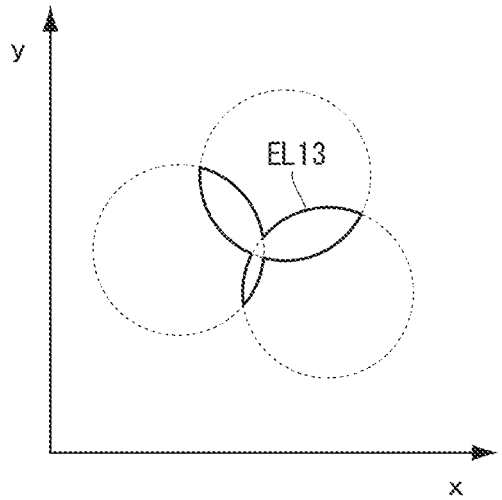

INFORMATION PROCESSING DEVICE, INFORMATION PROCESSING METHOD, INFORMATION PROCESSING PROGRAM, AND MICROSCOPE FOR DISPLAYING A PLURALITY OF SURFACE IMAGES

CROSS REFERENCE TO RELATED APPLICATION

This is a Continuation of PCT Application No. PCT/JP2018/020865, filed on May 30, 2018. The contents of the above-mentioned application are incorporated herein by reference.

FIELD OF THE INVENTION

The present invention relates to an information processing device, an information processing method, an information processing program, and a microscope.

BACKGROUND

STORMS, PALMs, and the like, for example, are known as super-resolution microscopes. In STORMS, a fluorescent substance is activated and the activated fluorescent substance is irradiated with excitation light to thereby acquire a fluorescent image (see Patent Literature 1 below).

CITATION LIST

Patent Literature

[Patent Literature 1] US Patent Application Publication No. 2008/0182336

SUMMARY

A first aspect of the invention is to provide an information processing device comprising: an image processor which generates surface information from point cloud data generated on the basis of position information of an object, using a value of a first parameter and a value of a second parameter; and a display controller which causes a display to display a surface image on the basis of the generated surface information, wherein the image processor generates a plurality of pieces of surface information, using a plurality of values of the first parameter and a plurality of values of the second parameter, and the display controller causes the display to display a plurality of surface images on the basis of the plurality of pieces of generated surface information.

The display controller may be configured to cause the display to display a plurality of surface images in an arranged manner.

The display controller may be configured to cause the display to display a surface image at a position corresponding to the value of each parameter where the vertical axis represents the values of the first parameter and the horizontal axis represents the values of the second parameter. Alternatively, the display controller may be configured to cause the display to display, in a manner of being arranged in a row direction, a plurality of surface images corresponding to a plurality of pieces of surface information generated using a plurality of values of the first parameter, and display, in a manner of being arranged in a column direction, a plurality of surface images corresponding to a plurality of pieces of surface information generated using a plurality of values of the second parameter. Alternatively, the display controller may be configured to cause the display to display, in a manner of being arranged in a vertical axis direction, a plurality of surface images corresponding to a plurality of pieces of surface information generated using a plurality of values of the first parameter, and display, in a manner of being arranged in a horizontal axis direction, a plurality of surface images corresponding to a plurality of pieces of surface information generated using a plurality of values of the second parameter.

Any of the above display controllers may be configured to cause the display to display a setting screen to set the value of a first parameter and the value of a second parameter, and display, on the setting screen, the value of a first parameter and the value of a second parameter corresponding to a surface image selected from a plurality of surface images displayed on the display.

The image processor may be configured such that it calculates a scalar field, applying a predetermined function in a region within a predetermined distance from each point data of the point cloud data, discretizes a scalar field at a grid point, and calculates the surface information, calculating an isosurface of a scalar value of the grid point, and that the value of the first parameter and the value of the second parameter are any one of a value related to the size of the region, a value related to the resolution of the grid point, and a value of the isosurface.

A second aspect of the invention is to provide a microscope comprising: the information processing device of the first aspect; an illumination optical system which irradiates an excitation light to excite a fluorescent substance contained in a sample; an observation optical system which forms an image of light from the sample; and an image capturer which captures the image formed by the observation optical system, wherein the image processor calculates position information of the fluorescent substance on the basis of a result captured by the image capturer, and generates the point cloud data, using the calculated position information.

A third aspect of the invention is to provide a microscope comprising: the information processing device of the first aspect; an optical system which irradiates activation light for activating a part of a fluorescent substance contained in a sample; an illumination optical system which irradiates an excitation light to excite at least a part of the activated fluorescent substance; an observation optical system which forms an image of light from the sample; and an image capturer which captures the image formed by the observation optical system, wherein the image processor calculates position information of the fluorescent substance on the basis of a result captured by the image capturer, and generates the point cloud data, using the calculated position information.

A fourth aspect of the invention is to provide an information processing method for generating surface information from point cloud data generated on the basis of position information of an object, using a value of a first parameter and a value of a second parameter, and causing a display to display a surface image on the basis of the generated surface information, the information processing method comprising: generating a plurality of pieces of surface information, using a plurality of values of the first parameter and a plurality of values of the second parameter; and causing the display to display a plurality of surface images on the basis of the plurality of pieces of generated surface information.

A fifth aspect of the invention is to provide a computer-readable non-transitory tangible medium containing an information processing program which causes a computer to execute processes of generating surface information from point cloud data generated on the basis of position information of an object, using a value of a first parameter and a value of a second parameter, and causing a display to display a surface image on the basis of the generated surface information, the information processing program including processes of: generating a plurality of pieces of surface information, using a plurality of values of the first parameter and a plurality of values of the second parameter; and causing the display to display a plurality of surface images on the basis of the plurality of pieces of generated surface information.

BRIEF DESCRIPTION OF DRAWINGS

FIG. 1 is a diagram showing an information processing device according to a first embodiment.

FIG. 3A to FIG. 3D are diagrams showing a process of generating a function which represents a scalar field according to the first embodiment.

FIG. 5 is a diagram showing a process of discretizing the scalar field in the first embodiment.

FIG. 10A and FIG. 10B are diagrams showing isosurfaces on the basis of radiuses in the first embodiment.

DETAILED DESCRIPTION OF EMBODIMENTS

First Embodiment

Figure 2A:
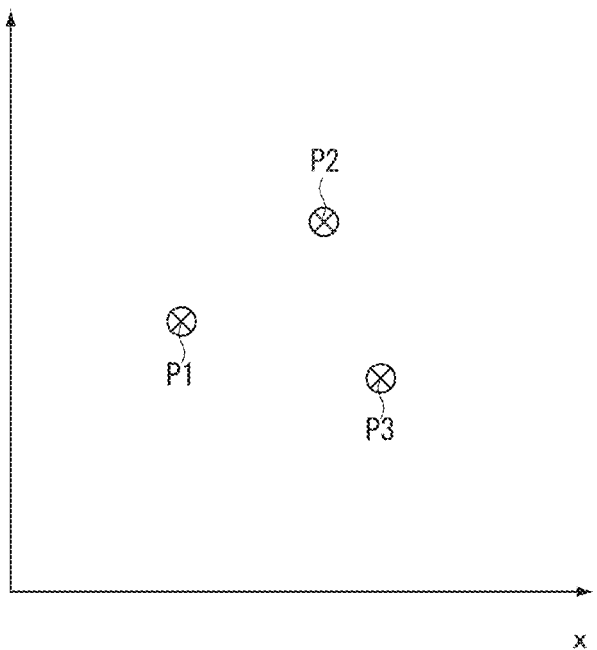
FIG. 2A to FIG. 2C are diagrams showing an example of point cloud data and a function of a local field according to the first embodiment.

Hereunder, a first embodiment will be described. FIG. 1 is a diagram showing an information processing device according to a first embodiment. An information processing device 1 according to the embodiment generates an image (a point cloud image), using point cloud data DG, and displays it on a display device 2. The information processing device 1 processes the point cloud data DG. The point cloud data DG is a set of a plurality of pieces of N-dimensional data D1 (where N is an any integer of 2 or greater). The N-dimensional data D1 is a piece of data (for example, vector data) in which N values are grouped as a set. For example, in FIG. 1, the point cloud data DG is a piece of three-dimensional data in which coordinate values in a three-dimensional space (for example, x1, y1, z1) are grouped as a set. In the following description, it is assumed that N mentioned above is 3. N may be 2, or 4 or greater. In FIG. 1, the point cloud data DG is m pieces of N-dimensional data. m is any integer 2 or greater.

The point cloud image is an image generated using the point cloud data DG. For example, in the case where the point cloud data DG is a piece of three-dimensional data in which coordinate values in a three-dimensional space are grouped as a set (for example, x1, y1, z1), the point cloud image is an image displaying a point at each coordinate position. The size of the displayed point can be changed as appropriate. The shape of the displayed point is not limited to a circular shape, and may be another shape such as an elliptical shape and a rectangular shape. Point cloud data is sometimes referred to simply as point cloud. In the present specification, a plurality of points on a point cloud image are referred to as point cloud where appropriate.

The point cloud data DG is supplied, for example, from an external device of the information processing device 1 (hereunder, referred to as external device) to the information processing device 1. The above-mentioned external device is, for example, a microscope main body 51 shown later in FIG. 25. The above-mentioned external device need not be the microscope main body 51. For example, the external device may be a CT scanner to detect the value at each point within an object, or a measuring device to measure the shape of an object. The information processing device 1 may generate point cloud data DG on the basis of data supplied from the external device and may process the generated point cloud data DG.

The information processing device 1 executes processing on the basis of input information input by the user using a graphical user interface. The information processing device 1 is connected to the display device 2 (the display). The display device 2 is, for example, a liquid crystal display or the like. The information processing device 1 supplies data of an image to the display device 2 and causes the display device 2 to display the image. The display device 2 is, for example, a device externally attached to the information processing device 1. However, the display device 2 may be a part of the information processing device 1.

The information processing device 1 is connected to an input device 3 (an inputter). The input device 3 is an input interface which can be operated by the user. The input device 3 includes, for example, at least one of a mouse, a keyboard, a touch pad, and a trackball. The input device 3 detects an operation performed by the user and supplies the detection result to the information processing device 1 as input information input by the user.

In the following description, it is assumed that the input device 3 is a mouse. When the input device 3 is a mouse, the information processing device 1 causes the display device 2 to display a pointer. The information processing device 1 acquires mouse movement information and click information from the input device 3 as input information detected by the input device 3. The mouse movement information represents, for example, an amount of movement the mouse makes. The click information represents whether or not a button of the mouse has been operated (for example, whether or not a click has been performed).

The information processing device 1 causes the pointer to move on the screen of the display device 2 on the basis of the mouse movement information. The information processing device 1 executes, on the basis of click information, a process assigned to the position of the pointer and the click information (for example, a left-click, a right-click, a drag, or a double-click). The input device 3 is, for example, a device externally attached to the information processing device 1, however, it may be a part of the information processing device 1 (for example, a built-in touch pad). The input device 3 may be a touch panel or the like integrated with the display device 2.

The information processing device 1 includes, for example, a computer. The information processing device 1 includes an operating system 5 (hereunder, referred to as OS 5), a UI 6 (a user interface), an image processor 7, and a memory storage 9. The information processing device 1 executes various processes according to a program stored in the memory storage 9. The OS 5 provides an interface between the outside and the inside of the information processing device 1. For example, the OS 5 controls the supply of image data to the display device 2. The OS 5 acquires input information from the input device 3. The OS 5 supplies user input information to, for example, an application which manages an active GUI screen on the display device 2. For example, when a window managed by the application executed by the process of the UI 6 is active, user input information is provided to the UI 6.

The UI 6 includes an input controller 11 and an output controller 12. The output controller 12 is a display controller which causes the display (the display device 2) to display a setting screen to set calculation conditions (such as setting information, setting values, parameter values, surface information, mation generation conditions) used to generate surface information. The setting screen is, for example, a GUI screen W shown later in FIG. 11 to FIG. 16 and so forth. The GUI screen W is a window or the like provided by an application. The display controller (for example, the output controller 12) displays, on the display (the display device 2), an image representing surface information generated by the image processor 7. The display controller (for example, the output controller 12) may display the setting screen and the image representing surface information in the same region (for example, the same window) on the display device 2. The display controller (for example, the output controller 12) may display the setting screen and the image representing surface information in different regions (for example, a first window and a second window) on the display device 2.

Information constituting the GUI screen W (hereunder, referred to as GUI information) is stored in, for example, the memory storage 9. The output controller 12 reads out GUI information from the memory storage 9 and supplies the GUI information to the OS 5. The OS 5 causes the display device 2 to display the GUI screen on the basis of the GUI information supplied from the output controller 12. Thus, the output controller 12 causes the display device 2 to display the GUI screen by supplying GUI information to the OS 5.

The input controller 11 acquires input information input by the user using the GUI screen. For example, the input controller 11 acquires mouse movement information and click information as input information from the OS 5. When the click information indicates a click operation having been performed, the input controller 11 executes a process assigned to the click operation indicated by the click information, on the basis of the coordinates of the pointer on the GUI screen obtained from the mouse movement information.

For example, it is assumed that a right-click has been detected as having been performed on the GUI screen. It is also assumed that the process assigned to a right-click is a process of displaying a menu. In such a case, the input controller 11 causes the output controller 12 to execute the process of displaying the menu. Information which represents the menu is included in the GUI information, and the output controller 12 causes the display device 2 to display the menu via the OS 5 on the basis of the GUI information.

Now, it is assumed that a left-click has been detected as having been performed on the GUI screen. It is preliminarily defined that if a left-click is preformed while the pointer is being placed over a button on the GUI screen, the process assigned to this button is executed. The input controller 11 identifies the position of the pointer on the GUI screen on the basis of mouse movement information, and determines whether or not a button is present at the identified position of the pointer. If a left-click is detected as having been performed in the state where a button is present at the position of the pointer, the input controller 11 executes the process assigned to this button.

The image processor 7 generates surface information on the basis of the point cloud data DG, using calculation conditions set on the setting screen (for example, the GUI screen W). The image processor 7 includes a field calculator 7A and a surface generator 7B. The field calculator 7A calculates a scalar field on the basis of the point cloud data DG. The field calculator 7A calculates a function representing a scalar field on the basis of the point cloud data DG including the coordinates of a plurality of points.

The field calculator 7A generates a local scalar field on the basis of each of one or more pieces of point data of (for each of one or more pieces of point data of) the point cloud data DG, and calculates a scalar field on the basis of the local scalar field. The field calculator 7A calculates (generates) a function representing a scalar field on the basis of a local field in the case where the source origin of the local field is arranged at each of one or more point among the plurality of points included in the point cloud data DG. A process of calculating a function representing a scalar field (referred to as field calculation process where appropriate) will be described, with reference to FIG. 2A to FIG. 2C, FIG. 3A to FIG. 3D, FIG. 4A to FIG. 4B, and FIG. 5. In FIG. 2A to FIG. 2C, FIG. 3A to FIG. 3D, FIG. 4A to FIG. 4B, and FIG. 5, processes are described on a two-dimensional plane, however, extending the processes to three dimensions would enable processing of three-dimensional point cloud data DG in a similar manner.

Figure 2B:
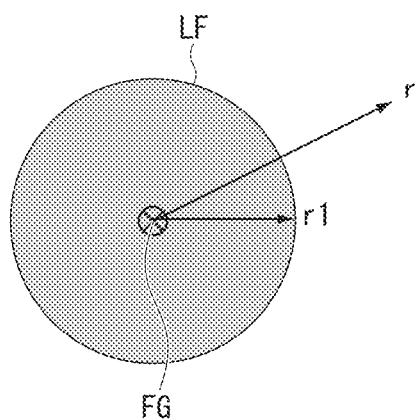
Figure 2C:
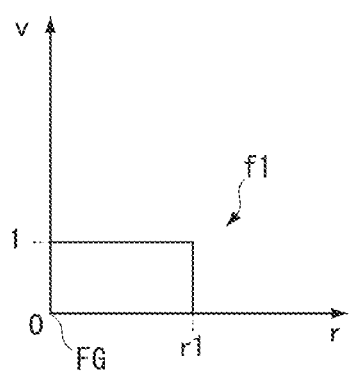

FIG. 2A to FIG. 2C are diagrams showing an example of the point cloud data and a function of a local field according to the first embodiment. In FIG. 2A, reference signs P1 to P3 each denote points included in the point cloud data DG. Here, the coordinates of the point P1 are represented by (x1, y1), the coordinates of the point P2 are represented by (x2, y2), and the coordinates of the point P3 are represented by (x3, y3).

FIG. 2B and FIG. 2C are diagrams showing an example of a local field (a local scalar field). Reference sign LF in FIG. 2B denotes a local field, and reference sign FG denotes the source origin of the local field LF. The local field (a local scalar field) is a function in which the value changes stepwise with respect to the distance from each point data within a range of a predetermined distance from each point data. For example, a function which represents a local field is a function in which the value (the scalar value) changes stepwise with respect to the distance from the argument point to a predetermined point (for example, a source origin FG). As shown in FIG. 2C, the function f1 representing the local field LF is a function in which the value changes stepwise with respect to a distance r from the source origin FG (the origin 0). The value of f1 at each point of field (argument point) is defined by the distance r from a predetermined point (a source origin) corresponding to each point data selected from the point cloud data to each point of field, and the value within a region where the distance r is 0 or more and less than r1 (for example, 1) and the value within a region where the distance r is r1 or more (for example, 0) changes stepwise.

The local scalar field (the local field) may be a function in which the value is constant in a region where the distance from each point data is equal to or greater than a threshold value. The function representing the local field may be a function in which the value (the scalar value) is constant in a region where the distance from the argument point to a predetermined point (for example, the source origin FG) is equal to or greater than a threshold value. For example, the function f1 in FIG. 2C is a function in which the value is constant (for example, 0) in the region where the distance r is equal to or greater than a threshold value (r1).

The local scalar field (the local field) may be a function where the value decreases with respect to the distance from each point data within a range of a predetermined distance from each point data. The function representing the local field may be a function in which the value (the scalar value) decreases with respect to the distance from the argument point to a predetermined point (for example, the source origin FG). The value of the function f1 in FIG. 2C is a function in which the value in the region where the distance r is r1 or more (for example, 0) decreases with respect to the value in the region where the distance r is 0 or more and less than r1 (for example 1). The function f1 of FIG. 2C is a function in which the value decreases with respect to the distance r from the source origin FG, and is a function which represents an attenuation field as the local field LF.

FIG. 3A to FIG. 3D are diagrams showing a process of generating a function representing a scalar field according to the first embodiment. The upper figure of FIG. 3A shows a local field LF1 originating from the point P1. The lower figure of FIG. 3A shows a distribution of the value v of the local field LF1 where y=y1 (indicated by the dotted line in the upper figure of FIG. 3A). The upper figure of FIG. 3B shows a local field LF2 originating from the point P2. The lower figure of FIG. 3B shows a distribution of the value v of the local field LF2 where y=y1 (indicated by the dotted line in the upper figure of FIG. 3B). The upper figure of FIG. 3C shows a local field LF3 originating from the point P1. The lower figure of FIG. 3C shows a distribution of the value v of the local field LF3 where y=y1 (indicated by the dotted line in the upper figure of FIG. 3C).

The upper figure of FIG. 3D shows a scalar field FS formed by the local field LF1 to the local field LF3. The scalar field FS is represented by superposing the local field LF1, the local field LF2, and the local field LF3. The lower figure of FIG. 3D shows a distribution of the value v of the scalar field FS where y=y1 (indicated by the dotted line in the upper figure of FIG. 3D). The value v of the scalar field FS is 0 in a region where none of the local field LF1 to the local field LF3 is present. The value v of the scalar field FS is 1 in a region where only one local field among the local field LF1 to the local field LF3 is present. The value v of the scalar field FS is 2 in a region where two of the local fields among the local field LF1 to the local field LF3 are superposed. The value v of the scalar field FS is 3 in a region where the local field LF1, the local field LF2, and the local field LF3 are all superposed.

The field calculator 7A (see FIG. 1) calculates the distribution of the value v in the scalar field FS by superimposing the local fields (LF1, LF2, LF3) originating from the respective points (P1, P2, P3). For example, the field calculator 7A applies a filter (for example, Laplacian, or Gaussian) to the function that represents the superposition of the local fields to calculate a function that represents a scalar field. The function representing the scalar field may be represented by a mathematical expression, or may be represented by table data which combines coordinate values and a scalar value as a set. As a function representing the scalar field FS, the field calculator 7A may calculate a coefficient of a mathematical expression in a preliminarily set function form, or may calculate the table data mentioned above.

Figure 4A:
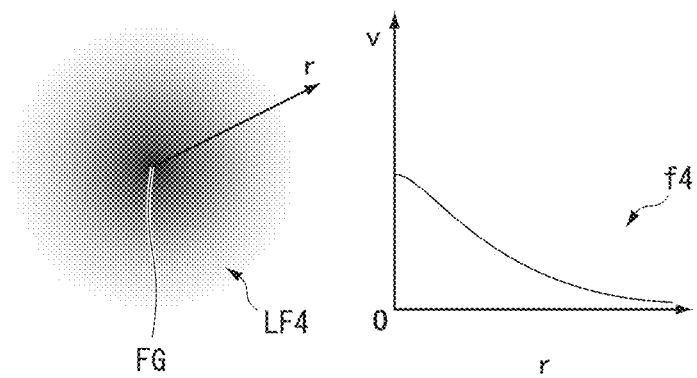
FIG. 4A to FIG. 4B are diagrams showing an example different from that of FIG. 2A to FIG. 2C, concerning the function of a local field according to the first embodiment.
Figure 4B:
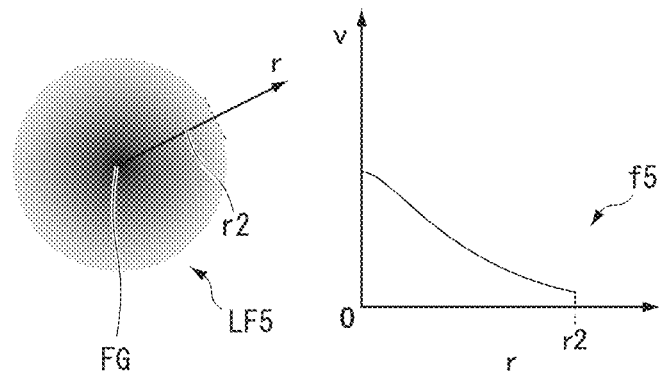

The form of local scalar fields (local fields) is not limited to the form of FIG. 2B. FIG. 4A to FIG. 4B are diagrams showing an example different from that of FIG. 2A, FIG. 2B, and FIG. 2C, concerning the function of the local field according to the first embodiment. The local scalar field (the local field) may be a function where the value continuously changes with respect to the distance from each point data within a range of a predetermined distance from each point data. The function representing the local field may be a function in which the value (the scalar value) continuously changes with respect to the distance from the argument point thereof to a predetermined point (for example, the source origin FG).

In FIG. 4A, the function f4 representing the local field LF4 is a function in which within a predetermined range (for example, a range where r is 0 or more) of the distance from the position (the source origin FG, the predetermined position) of each point data selected from the point cloud data, the value v continuously changes with respect to the distance r from the position (the source origin FG, the predetermined position) of each point data to each point of the field. The function f4 is a function in which the value decreases with respect to the distance from the source origin FG. The function f4 is, for example, a function representing a Gaussian distribution, however, it may be another function. In FIG. 4B, the function f5 is a function in which within a predetermined range (for example, a range where r is 0 or more and less than r2) of the distance from the position (the source origin FG, the predetermined position) of each point data selected from the point cloud data, the value v continuously changes with respect to the distance r from the position (the source origin FG, the predetermined position) of each point data to each point of the field. The function f5 is a function in which the value is constant (for example, 0)

in a region where the distance r from the source origin FG is equal to or greater than the threshold value r2.

The surface generator 7B shown in FIG. 1 generates surface information representing an isosurface in the scalar field calculated by the field calculator 7A. The isosurface mentioned above is a surface in which the scalar value is a user-specified value in the scalar field. The input controller 11 is an input information acquirer which acquires a scalar value input by the inputter (the input device 3). The surface generator 7B calculates the isosurface of a scalar field on the basis of the scalar value acquired by the input information acquirer (for example, the input controller 11) and generates surface information. The process of acquiring a specified value of scalar value will be described later with reference to FIG. 12 and so forth.

The surface generator 7B discretizes a scalar field at a grid point and generates surface information using the scalar value of the grid point. The surface generator 7B discretizes the scalar field into a value (a scalar value) at the grid point. The surface generator 7B generates surface information using data in which the function representing the scalar field is represented as a scalar value on the grid point. The surface generator 7B discretizes the scalar field to generate surface information.

FIG. 5 is a diagram showing the process of discretizing a scalar field in the first embodiment. In FIG. 5, reference sign GLx denotes grid lines parallel to the x axis, and reference sign dy denotes intervals between the grid lines GLx. Reference sign GLy denotes grid lines parallel to the y axis, and reference sign dx denotes intervals between the grid lines GLy. The grid points P4 are intersections between the grid lines GLx and the grid lines GLy. The interval between adjacent grid points P4 on the grid lines GLx is an interval dx of the grid lines GLy. The interval between adjacent grid points P4 on the grid lines GLy is an interval dy of the grid lines GLx. Here, the interval dx and the interval dy are equal. In the following description, the interval dx and the interval dy are collectively referred to as resolution d where appropriate.

The surface generator 7B calculates the value of the scalar field FS at each of the grid points P4. For example, among the grid points P4, the grid point P4a is a region where none of the local field LF1 to the local field LF3 is present, and the scalar value (v) is 0. Among the grid points P4, the grid point P4b is a region where only the local field LF1 is present, and the scalar value (v) is 1. Among the grid points P4, the grid point P4c is a region where the local field LF1 and the local field LF2 is present, and the scalar value (v) is 2. Among the grid points P4, the grid point P4d is a region where all of the local field LF1 to the local field LF3 are present, and the scalar value (v) is 3. The field calculator 7A may execute the process of discretizing the scalar field. For example, as a function representing the scalar field FS, the field calculator 7A may calculate table data which combines coordinate values and a scalar value as a set.

Next, with reference to FIG. 6A to FIG. 6E, FIG. 7, FIG. 8A to FIG. 8C, FIG. 9A to FIG. 9D, FIG. 10A, and FIG. 10B, the process of generating an isosurface (a constant-level surface) will be described. In FIG. 6A to FIG. 6E, FIG. 7, FIG. 8A to FIG. 8C, FIG. 9A to FIG. 9D, FIG. 10A, and FIG. 10B, the process is described on a two-dimensional plane, however, extending this process to three dimensions would enable processing of three-dimensional point cloud data DG in a similar manner. In FIG. 6A to FIG. 6E, FIG. 7, FIG. 8A to FIG. 8C, FIG. 9A to FIG. 9D, FIG. 10A, and FIG. 10B, isosurfaces are represented by isolines.

FIG. 6A to FIG. 6E are diagrams showing the process of generating an isosurface in the first embodiment. The surface generator 7B generates surface information by means of the marching cube method or a method to which the marching cube method is applied, for example. The surface generator 7B generates polygon data representing an isosurface as surface information.

Figure 6A:
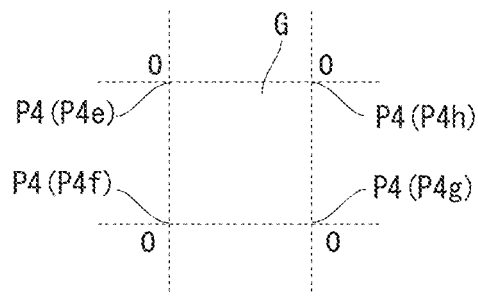
FIG. 6A to FIG. 6E are diagrams showing a process of generating an isosurface in the first embodiment.

In FIG. 6A to FIG. 6E, reference signs P4e to P4h are respectively the grid points P4 shown in FIG. 5. The surface generator 7B generates surface information on the basis of the relationship between the value of a scalar field at a first grid point (for example, the grid point P4e) and the value of a scalar field at a second grid point (for example, the grid point P4f) adjacent to the first grid point. In FIG. 6A to FIG. 6E, the number (0 or 1) shown near each grid point is the scalar value of each grid point. Here, the scalar value at each grid point is 0 or 1. The scalar values of the grid point P4e, the grid point P4f, the grid point P4g, and the grid point P4h are represented as a set. For example, the scalar value set of FIG. 6A is (0, 0, 0, 0). A square region with the grid point P4e, the grid point P4f, the grid point P4g, and the grid point P4h serving as vertices thereof is referred to as grid G.

When the scalar value of the grid point P4e is greater than a specified value and the scalar value of the grid point P4f adjacent to the grid point P4e is less than the specified value, the surface generator 7B determines that an end of the isoline in the grid G exists between the grid point P4e and the grid point P4f.

For example, the scalar value set of FIG. 6A is (0, 0, 0, 0), and the scalar values of adjacent grid points are all less than the specified value. In such a case, the surface generator 7B determines that an isoline is not present in the grid G.

Figure 6B:
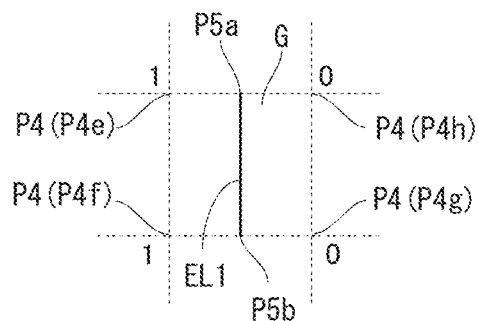

The scalar value set of FIG. 6B is (1, 1, 0, 0), and the surface generator 7B determines that an end of an isoline is present both between the grid point P4e and the grid point P4h, and between the grid point P4f and the grid point P4g. The surface generator 7B takes the line connecting the midpoint P5a between the grid point P4e and the grid point P4h to the midpoint P5b between the grid point P4f and the grid point P4g as an isoline EL1.

Figure 6C:
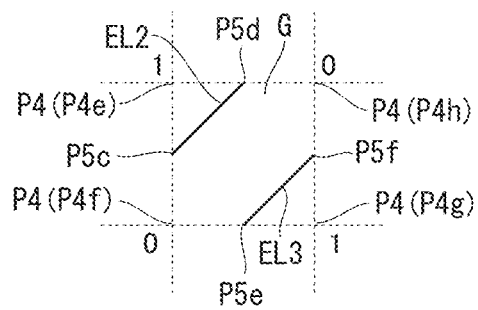

The scalar value set of FIG. 6C is (1, 0, 1, 0). In such a case, an end of an isoline is present between the grid point P4e and the grid point P4h, between the grid point P4e and the grid point P4f, between the grid point P4f and the grid point P4g, and between the grid point P4g and the grid point P4h. In such a case, for example, two isolines are present in the grid G. The surface generator 7B derives isolines so that the isolines do not intersect each other, for example. For example, the surface generator 7B takes the line connecting the midpoint P5c between the grid point P4e and the grid point P4f to the midpoint P5d between the grid point P4e and the grid point P4h as an isoline EL2. The surface generator 7B takes the line connecting the midpoint P5e between the grid point P4f and the grid point P4g to the midpoint P5f between the grid point P4g and the grid point P4h as an isoline EL3.

Figure 6D:
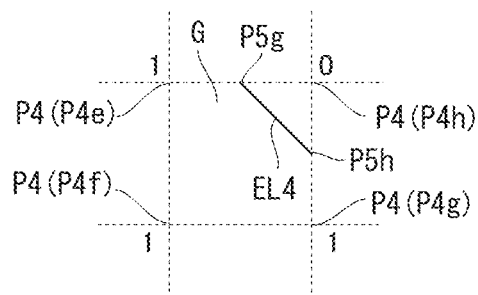
Figure 6E:
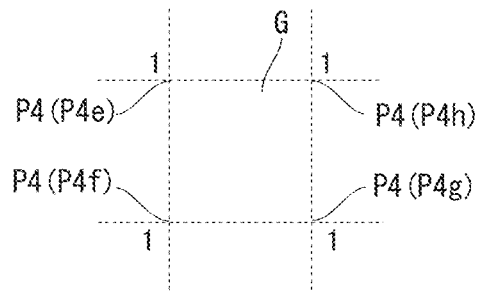

The scalar value set of FIG. 6D is (1, 1, 1, 0). The surface generator 7B takes the line connecting the midpoint P5g between the grid point P4e and the grid point P4h to the midpoint P5h between the grid point P4g and the grid point P4h as an isoline EL4. The scalar value set of FIG. 6E is (1, 1, 1, 1), and the scalar values of adjacent grid points are all greater than the specified value. In such a case, the surface generator 7B determines that an isoline is not present in the grid G.

The surface generator 7B searches for an isoline in one grid G, and then searches for an isoline in the adjacent grid G in a similar manner. The surface generator 7B generates surface information by connecting an isoline in a grid G to an isoline in the adjacent grid G. The surface generator 7B may generate surface information while simplifying the shape represented by polygon data. For example, the surface generator 7B may apply a low-pass filter to connected isolines to generate surface information.

Figure 7:
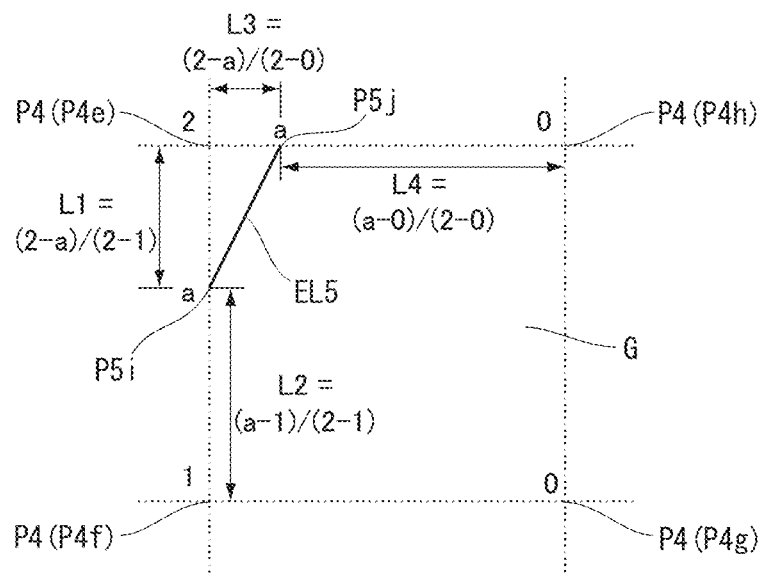
FIG. 7 is a diagram showing a process of generating an isosurface in the first embodiment.

The process of generating surface information is not limited to the example shown in FIG. 6A to FIG. 6E. FIG. 7 is a diagram showing a process of generating an isosurface in the first embodiment. In FIG. 6A to FIG. 6E, the end of the isoline is set at the midpoint between the grid points, however, in FIG. 7, the position of the end of an isoline is set by weighting, on the basis of the scalar value and the specified value of the grid point.

In FIG. 7, it is assumed that the scalar value set is (2, 1, 0, 0), and the specified value of the scalar value is a value greater than 1 and less than 2. It is also assumed that the distance between the grid point P4$e$ and an end P5$i$ of the isoline EL5 is L1, and the distance between the grid point P4$f$ and the end P5$i$ of the isoline EL5 is L2. In the surface generator 7B sets the position of the end P5$i$ so that the ratio of the distance L1 to the distance L2 equals to the ratio of the difference between the scalar value (2) of the grid point P4$e$ and the specified value (a) to the difference between the scalar value (1) of the grid point P4$f$ and the specified value (a).

For example, the surface generator 7B sets the distance L1 to (2−a)/(2−1). For example, when a=1.6, the distance L1 is 0.4 and the distance L2 is 0.6. Thus, between the grid point P4$e$ and the grid point P4$f$, the end P5$i$ is set at a position closer to the grid point P4$e$ (the scalar value is 2), the scalar value of which is closer to the specified value (a=1.6). Also between the grid point P4$e$ and the grid point P4$h$, the surface generator 7B sets the distance L3 between the grid point P4$e$ and the end P5$j$ of the isoline EL5 to (2−a)/(2−0) in a similar manner. The surface generator 7B sets the distance L4 between the grid point P4$h$ and the end P5$j$ of the isoline EL5 to (a−2)/(2−0). When a=1.6, the distance L3 is 0.2 and the distance L4 is 0.8. Thus, between the grid point P4$e$ and the grid point P4$h$, the end P5$j$ is set at a position closer to the grid point P4$e$ (the scalar value is 2), the scalar value of which is closer to the specified value (a=1.6).

Figure 8A:
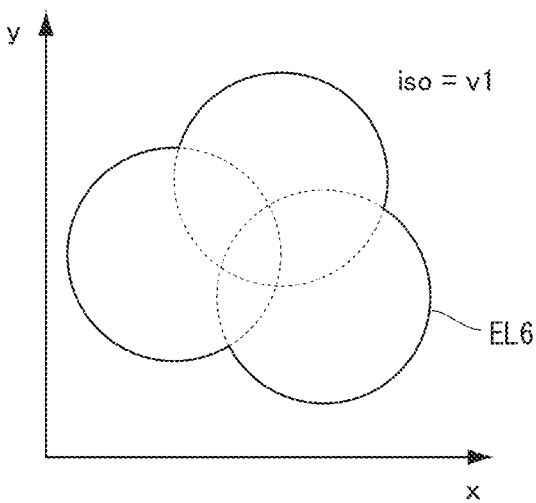
FIG. 8A to FIG. 8C are diagrams showing isosurfaces on the basis of scalar values in the first embodiment.
Figure 8B:
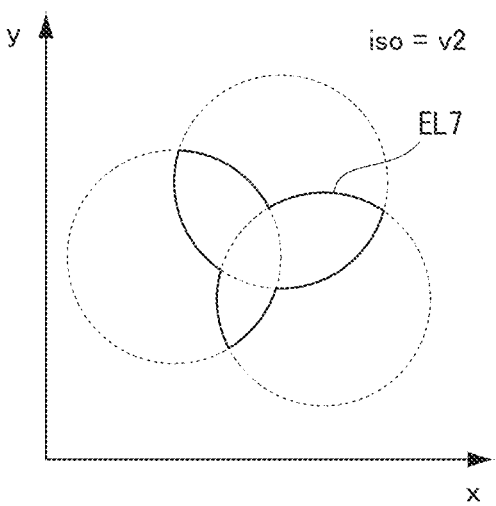
Figure 8C:
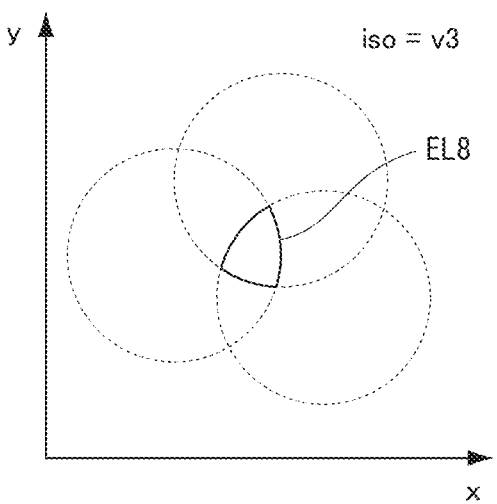

FIG. 8A to FIG. 8C are diagrams showing isosurfaces (isolines) on the basis of scalar values in the first embodiment. Here, for the scalar field of FIG. 5, an isosurface in the case where the specified value iso differs is shown. FIG. 8A shows an isosurface EL6 in the case where the specified value iso is v1. v1 is, for example, a value greater than 0 and less than 1 (for example, 0.5). FIG. 8B shows an isosurface EL7 in the case where the specified value iso is v2. v2 is, for example, a value greater than 1 and less than 2 (for example, 1.5). FIG. 8C shows an isosurface EL8 in the case where the specified value iso is v3. v3 is, for example, a value greater than 2 and less than 3 (for example, 2.5).

Thus, the extracted isosurface also differs when the specified value differs. In the case where the scalar field is an attenuation field, if the specified value of the scalar value is set to a large value (for example, FIG. 8C), the extracted isosurface will be smaller compared to that in the case where the specified value of the scalar value is set to a small value (for example, FIG. 8A).

Figure 9A:
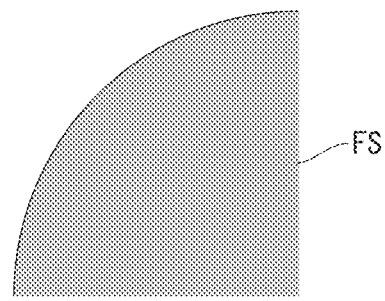
FIG. 9A to FIG. 9D are diagrams showing isosurfaces on the basis of resolutions in the first embodiment.
Figure 9B:
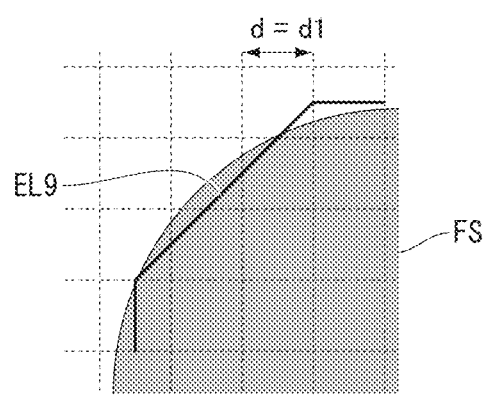
Figure 9C:
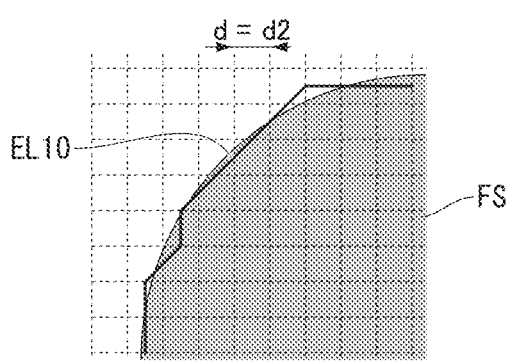
Figure 9D:
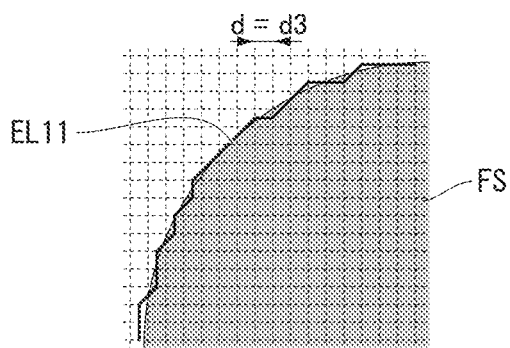

FIG. 9A to FIG. 9D are diagrams showing isosurfaces on the basis of resolutions in the first embodiment. FIG. 9A shows apart of the scalar field FS. FIG. 9B shows an isosurface EL9 in the case where the resolution d is set to d1 for the scalar field FS. FIG. 9C shows an isosurface EL10 in the case where the resolution d is set to d2 for the scalar field FS. Here, d2=(d1)/2. FIG. 9D shows an isosurface EL11 in the case where the resolution d is set to d3 for the scalar field FS. Here, d3=(d1)/4. When the resolution d is set low as in FIG. 9D, the isosurface can be extracted more finely compared to the case where the resolution d is set high as in FIG. 9B. When the resolution d is set high as in FIG. 9B, the processing load becomes lower than that in the case where the resolution d is set low as in FIG. 9D. Thus, the extracted isosurface also differs when the resolution differs.

FIG. 10A and FIG. 10B are diagrams showing isosurfaces on the basis of radiuses of local fields in the first embodiment. FIG. 10A shows an isosurface EL12 in the case where the radius r of local fields is r1 and the specified value of the scalar value is greater than 1 and less than 2, in contrast to the scalar field FS using the local field LF shown in FIG. 2B (see FIG. 3D). FIG. 10B shows an isosurface EL13 when the radius r of the local fields LF is r3. In FIG. 10A and FIG. 10B, r3 is set to a value smaller than r1. In the case where the scalar field is an attenuation field, when the radius r is set small as in FIG. 10B, the extracted isosurface becomes smaller than that in the case where the radius r is set large as in FIG. 10A. Thus, the extracted isosurface also differs when the radiuse r differs.

As explained in FIG. 8A to FIG. 8C, FIG. 9A to FIG. 9D, FIG. 10A, and FIG. 10B, the isosurface extracted by the surface generator 7B differs, depending on conditions for calculating the isosurface (for example, the specified value iso of the scalar value, the resolution d, the radius r). The UI 6 shown in FIG. 1 acquires information which specifies conditions for calculating an isosurface from information input by the user. The UI 6 causes the field calculator 7A to execute the process of calculating a scalar field, on the basis of the acquired input information. The UI 6 also causes the surface information 7B to execute the process of generating surface information, on the basis of the acquired input information.

Figure 11:
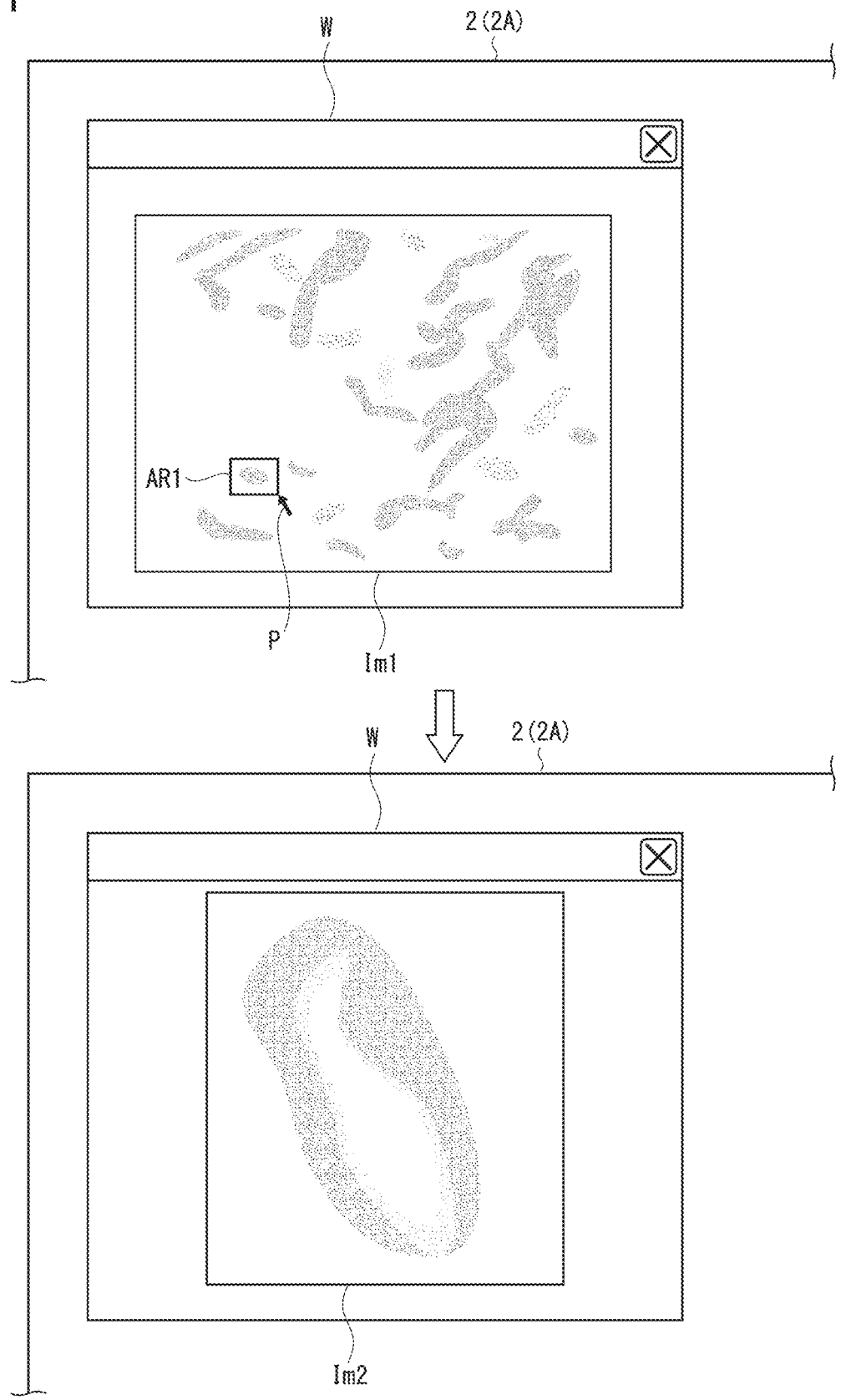
FIG. 11 is a diagram showing a process of a UI according to the first embodiment.

FIG. 11 is a diagram showing the process of the UI according to the first embodiment. The UI 6 generates a GUI screen W when an application is activated. The GUI screen is displayed in a display region 2A on the display device 2 (see FIG. 1). In FIG. 11, the GUI screen W is displayed in a part of the display region 2A, however, it may be displayed in full-screen in the display region 2A.

In the case where execution of the process to open the point cloud data DG is specified by input information, the UI 6 displays the point cloud data DG on the GUI screen W. The execution of the process to open the point cloud data DG may be specified by dragging and dropping a file of the point cloud data DG onto the GUI screen W. The execution of the process to open the point cloud data DG may also be specified by selecting a file of the point cloud data DG from a window showing the hierarchy of the files managed by the OS 5.

The information processing device 1 (see FIG. 1) includes an image generator 13. The image generator 13 generates a point cloud image Im1, using the point cloud data DG. In the present embodiment, a point cloud image (for example, the point cloud image Im1) is an image in which points of predetermined sizes are arranged at coordinates on the image corresponding to the coordinates of each point data of the point cloud data DG. All of the points displayed in the image may be of the same size, or some of the points may be of the size different from that of other points. A point cloud image (for example, the point cloud image Im1) is, for example, an image representing a spatial distribution of a plurality of points included in the point cloud data DG. The point cloud data DG may be generated preliminarily, or may be generated by the information processing device 1. For example, the information processing device 1 generates, by means of a rendering process, the point cloud image Im1 when the distribution of the points is viewed from a predetermined viewpoint.

In a STORM, a plurality of fluorescent images are acquired by activating a fluorescent substance and irradiating the activated fluorescent substance with an excitation light. The data of the plurality of fluorescence images are input to the information processing device 1. The image generator 13 calculates position information of the fluorescent substance in each fluorescent image, and generates point cloud data DG, using a plurality of pieces of the calculated position information. The image generator 13 generates the point cloud image Im1 representing the point cloud data DG. In the case of a two-dimensional STORM, the image generator 13 calculates two-dimensional position information of a fluorescent substance and generates point cloud data DG including a plurality of pieces of two-dimensional data. In the case of a three-dimensional STORM, the image generator 13 calculates three-dimensional position information of a fluorescent substance and generates point cloud data DG including a plurality of pieces of three-dimensional data. N-dimensional data such as the two-dimensional data and the three-dimensional data mentioned above can be acquired by means of not only a microscope but also CT scanning or the like. In a technique for processing N-dimensional data, for example, it is desirable that the user can with ease comprehend a shape represented by N-dimensional data.

The output controller 12 outputs the data of the point cloud image Im1 to the display device 2 via the OS 5. The display device 2 displays the point cloud image Im1 on the basis of the data output from the OS 5. For example, when the pointer P is detected as having performed a drag while being placed over the point cloud image Im1, the UI 6 can display the point cloud image Im1 as viewed from a changed viewpoint.

The UI 6 acquires information specifying a region AR1 (for example, (an ROI)) on the point cloud image Im1 as user input information. For example, when a left-click is detected as having been performed while the pointer P is being placed over the point cloud image Im1, the UI 6 sets a vertex of the rectangular region AR1 at the position of the pointer P. After having set the vertex of the rectangular region AR1, when the pointer P is detected as having performed a drag while being placed over the point cloud image Im1, the UI 6 sets the region AR1 with the vertex thereof being at the destination of the pointer P. The output controller 12 outputs the data of an image showing the set region AR1 to the display device 2 via the OS 5. The display device 2 displays the image showing the region AR1 being superposed on the point cloud image Im1.

The input controller 11 accepts user input information which indicates to conclusively determine the region AR1. When the input information indicating to conclusively determine the region AR1 is determined as having been accepted, the input controller 11 displays in the GUI screen W a point cloud image Im2 which enlarges the region AR1. For example, the information processing device 1 generates the point cloud image Im2 by means of a rendering process. The output controller 12 outputs the data of the point cloud image Im2 to the display device 2 via the OS 5. The display device 2 displays the point cloud image Im2 on the GUI screen W.

Figure 12:
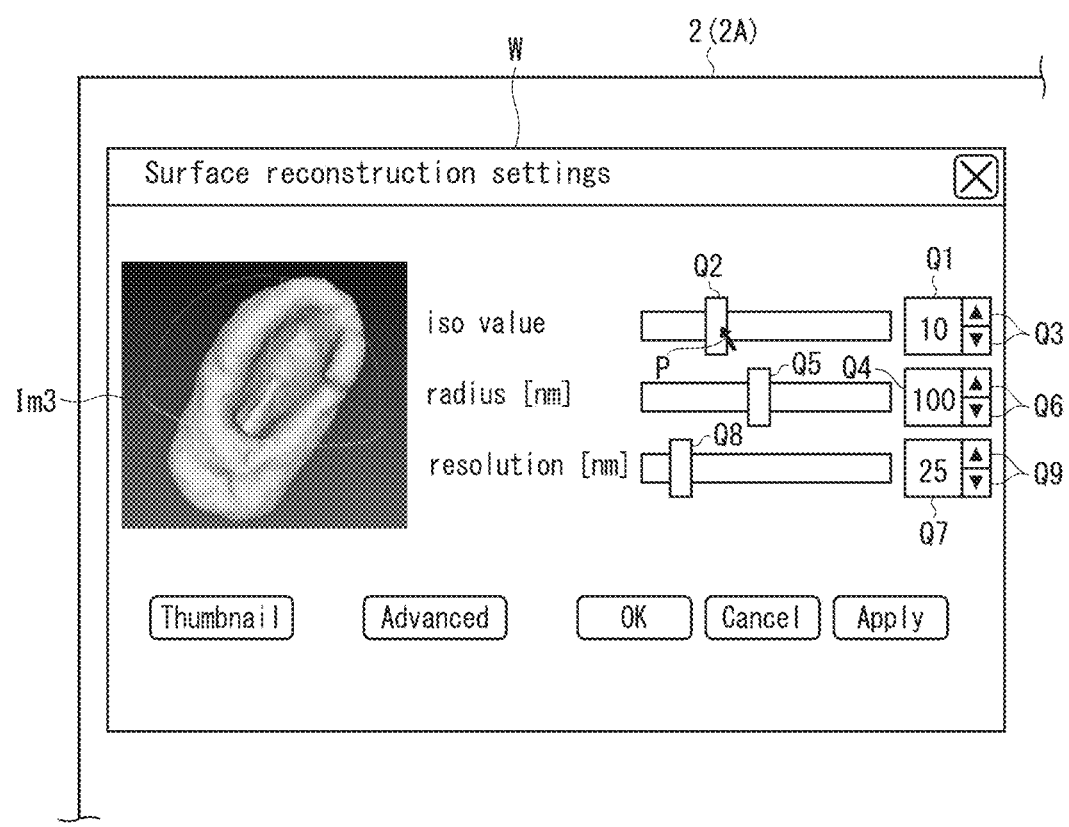
FIG. 12 is a diagram showing a setting process using the UI according to the first embodiment.

FIG. 12 is a diagram showing a setting process using the UI according to the first embodiment. In the present embodiment, the field calculator 7A calculates, under preliminarily set calculation conditions, a function which represents a scalar field for the region AR1 specified in FIG. 11. The surface generator 7B generates, under the preliminarily set calculation conditions, surface information for the region AR1 specified in FIG. 11, on the basis of the calculation result of the field calculator 7A. The output controller 12 displays in the GUI screen W a restored surface image Im3 representing the surface information obtained under the preset calculation conditions. In the present embodiment, the restored surface image (the restored surface image Im3) is an image which represents the shape of an object corresponding to a region surrounded by an isosurface. The restored surface image (for example, the restored surface image Im3) is, for example, an image which represents a surface restored (estimated) by the surface generator 7B as a surface of an object represented by the point cloud data DG.

The user can set parameters related to generating surface information, using the setting screen (for example, the GUI screen W). Examples of the parameters related to generating surface information include the scalar value of an isosurface ("iso value" in FIG. 12), the radius of a region covered by a local field ("radius (nm)" in FIG. 12), and the resolution d ("resolution (nm)" in FIG. 12). For example, the user can, using the setting screen (for example, the GUI screen W), set the value of "iso value" as a first parameter related to generating surface information, the value of "radius (nm)" as a second parameter related to generating surface information, and the value of "resolution (nm)" as a third parameter related to generating surface information. The user need not set at least one of the first to third parameters.

The setting screen (for example, the GUI screen W) includes first setting sections (denoted by reference signs Q1, Q2, and Q3 in FIG. 12) to set a scalar value (for example, "iso value"). The UI 6 acquires, as input information, information specifying a scalar value (for example, a specified value iso in FIG. 8A to FIG. 8C) in a scalar field. For example, the output controller 12 outputs to the GUI screen W an "iso value" representing a scalar value as an item specified in input information. The output controller 12 displays an input window Q1, a slider Q2, and buttons Q3 at positions preliminarily set with respect to the position displayed as "iso value". The output controller 12 displays a preliminarily set scalar value (for example, an initial value) in the input window Q1. In FIG. 12, "10" is displayed as the specified value of the preliminarily set scalar value.

When the pointer P is detected as having performed a drag while being placed over the slider Q2, the input controller 11 calculates the specified value of the scalar value on the basis of the movement amount of the pointer P. The output controller 12 updates the value displayed in the input window Q1 to the specified value calculated by the input controller 11. The image processor 7 (for example, the field calculator 7A) calculates the scalar field on the basis of the point cloud data DG. The image processor 7 (for example, the surface generator 7B) calculates the isosurface of the scalar field on the basis of the scalar value set in the first setting sections and generates surface information.

The user can also input the specified value for the scalar value as input information by operating a keyboard. For example, when a left-click is detected as having been performed while the point P is being placed over the input window Q1, the input controller 11 acquires a numerical value input using the keyboard. The output controller 12 updates the value displayed in the input window Q1 to the value acquired by the input controller 11 as a numerical value input using the keyboard.

The buttons Q3 are assigned with a process of increasing or decreasing the value displayed in the input window Q1. The input controller 11 calculates the specified value of the scalar value on the basis of the number of times a left-click is detected as having been performed while the pointer P is being placed over the button Q2 or the length of time during which a left-click is performed. The output controller 12 updates the value displayed in the input window Q1 to the specified value calculated by the input controller 11.

The setting screen (for example, the GUI screen W) includes setting sections (denoted by reference signs Q4, Q5, and Q6 in FIG. 12) to set information related to a local scalar field (for example, "radius (nm)"). "Radius (nm)" corresponds to information related to a threshold value of a function in which the value is constant within a region where the distance from each point data is equal to or greater than the threshold value. For example, f1 in FIG. 2C is a function in which the value is constant in a region where the distance from each point data is equal to or greater than the threshold value r1, and in such a case, the value of "radius (nm)" is used for the threshold value r1. For example, f5 in FIG. 4B is a function in which the value is constant in the region where the distance from each point data is equal to or greater than the threshold value r2, and in such a case, the value of "radius (nm)" is used for the threshold value r2. "Radius (nm)" may be a piece of information related to a coefficient of a function representing a local field. "Radius (nm)" may be used for the coefficient included in a function in which the value changes continuously (for example, f4 in FIG. 4A, or f5 in FIG. 4B). For example, the shape of a function (for example, the slope at each point) may be changed by changing the value specified by "radius (nm)". "Radius (nm)" may be a piece of information related to both the threshold value and the coefficient of the above function. For example, for f5 in FIG. 4B, if "radius (nm)" is reduced, r2 may be reduced and the slope of f5 may be increased.

The UI 6 acquires, as input information, information which specifies the radius of a local field (for example, the radius r in FIG. 10A and FIG. 10B). The UI 6 acquires, as information specifying the radius of a local field, information which specifies the radius centered on the source origin thereof. For example, the output controller 12 outputs to the GUI screen W "radius (nm)" representing the radius of a region covered by a local field as an item specified in the input information. The output controller 12 displays an input window Q4, a slider Q5, and buttons Q6 at positions preliminarily set with respect to the position displayed as "radius (nm)". The output controller 12 displays a preliminarily set radius (for example, an initial value) in the input window Q4. In FIG. 12, "100" is displayed as the preliminarily set radius.

When the pointer P is detected as having performed a drag while being placed over the slider Q5, the input controller 11 calculates the specified value of the radius on the basis of the movement amount of the pointer P. The output controller 12 updates the value displayed in the input window Q4 to the specified value calculated by the input controller 11. The image processor 7 (for example, the field calculator 7A) calculates the scalar field on the basis of information related to the local scalar field (for example, "radius (nm)") set in the setting sections denoted by reference signs Q4, Q5, and Q6 in FIG. 12.

The user can also input the specified value for the scalar value as input information by operating a keyboard. For example, when a left-click is detected as having been performed while the point P is being placed over the input window Q4, the input controller 11 acquires a numerical value input using the keyboard. The output controller 12 updates the value displayed in the input window Q4 to the value acquired by the input controller 11 as a numerical value input using the keyboard.

The buttons Q6 are assigned with a process of increasing or decreasing the value displayed in the input window Q4. The input controller 11 calculates the specified value of the radius on the basis of the number of times a left-click is detected as having been performed while the pointer P is being placed over the button Q6 or the length of time during which a left-click is performed. The output controller 12 updates the value displayed in the input window Q4 to the specified value calculated by the input controller 11.

The setting screen (for example, the GUI screen W) includes setting sections (denoted by reference signs Q7, Q8, and Q9 in FIG. 12) to set information related to the interval between grid points (for example, "resolution"). The UI 6 acquires, as input information, information which specifies an interval between grid points (for example, the resolution d in FIG. 10A and FIG. 10B) in the process of generating surface information. For example, the output controller 12 outputs to the GUI screen W "resolution (nm)" representing the resolution d as an item specified in the input information. The output controller 12 displays an input window Q7, a slider Q8, and buttons Q9 at positions preliminarily set with respect to the position displayed as "resolution (nm)". The output controller 12 displays a preliminarily set resolution (for example, an initial value) in the input window Q7. In FIG. 12, "25" is displayed as the preliminarily set resolution.

When the pointer P is detected as having performed a drag while being placed over the slider Q8, the input controller 11 calculates the specified value of the resolution d on the basis of the movement amount of the pointer P. The output controller 12 updates the value displayed in the input window Q7 to the specified value calculated by the input controller 11. The input information acquirer (the input controller 11) acquires information (for example, the value of the specified "resolution") related to the interval between the grid points input by the inputter (the input device 3). The surface generator 7B discretizes scalar fields at grid points on the basis of the input information related to the interval between the grid points.

The user can also input the specified value for the resolution d as input information by operating a keyboard. For example, when a left-click is detected as having been performed while the point P is being placed over the input window Q7, the input controller 11 acquires a numerical value input using the keyboard. The output controller 12 updates the value displayed in the input window Q7 to the value acquired by the input controller 11 as a numerical value input using the keyboard.

The buttons Q9 are assigned with a process of increasing or decreasing the value displayed in the input window Q7. The input controller 11 calculates the specified value of the resolution d on the basis of the number of times a left-click is detected as having been performed while the pointer P is being placed over the button Q9 or the length of time during which a left-click is performed. The output controller 12 updates the value displayed in the input window Q9 to the specified value calculated by the input controller 11.

"Thumbnail", "Advanced", "OK", "Cancel", and "Apply" buttons are displayed on the GUI screen W. A process of displaying other setting items is assigned to the "Advanced" button.

Figure 13:
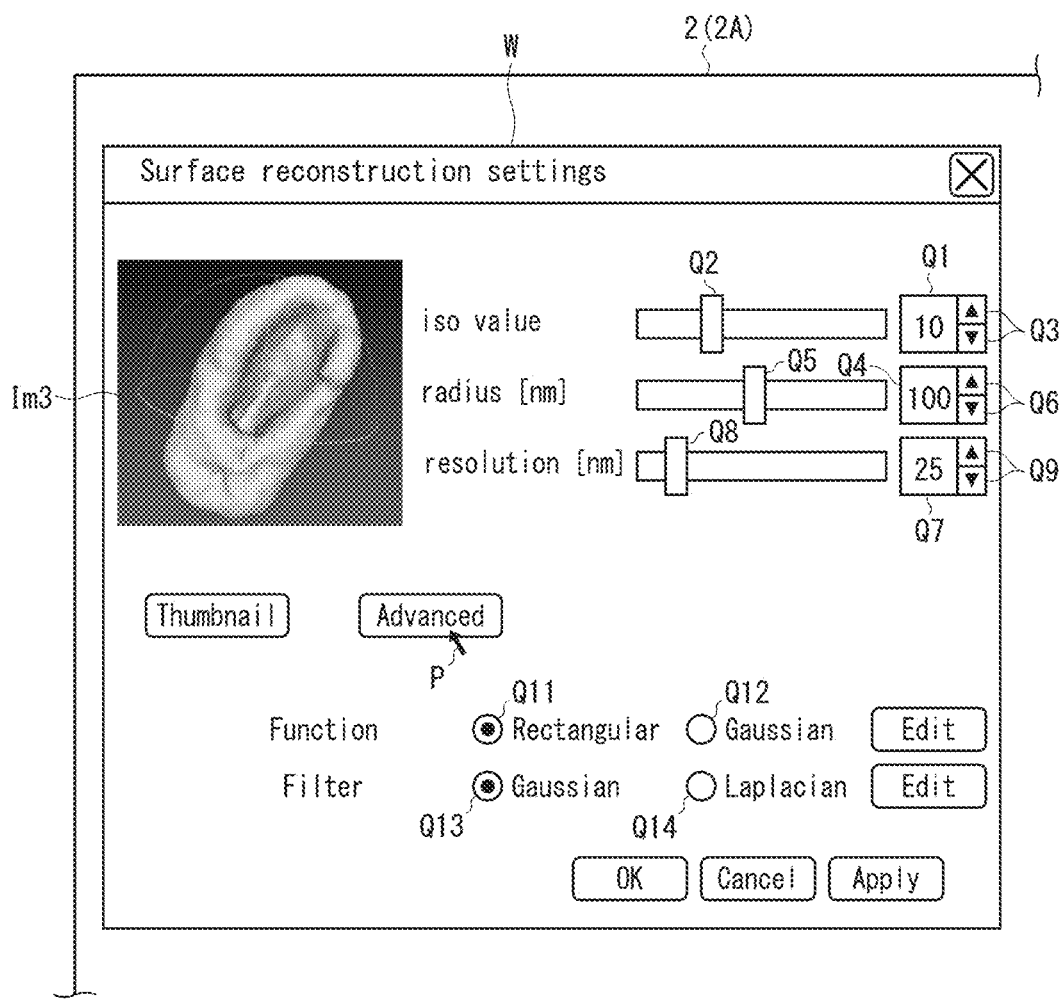
FIG. 13 is a diagram showing a setting process using the UI according to the first embodiment.

FIG. 13 is a diagram showing a setting process using the UI according to the first embodiment. The setting screen (for example, the GUI screen W) includes second setting sections (denoted by reference signs Q11 and Q12 in FIG. 13) to set information related to the function representing a local scalar field. When a left-click is detected as having been performed while the pointer P is being placed over the "Advanced" button, the input controller 11 causes the output controller 12 to execute the process of displaying other setting items. For example, as items specified in input information, the output controller 12 outputs to the GUI screen W "Function" which indicates a function representing a local field as an item specified in the input information.

The information related to a function mentioned above is information related to types of function (for example, "Rectangle", "Gaussian", "Edit" of "Function" in FIG. 13). The output controller 12 displays "Rectangle", a button Q11, "Gaussian", a button Q12, and "Edit" at positions preliminarily set with respect to the position displayed as "Function". The output controller 12 causes the display device 2 to display "Rectangle" and "Gaussian" as images showing candidates of the function representing a local field.

The button Q11 is assigned with a process of specifying a square-wave function (see FIG. 2C) as a function representing a local field. The button Q12 is assigned with a process of specifying a function representing a Gaussian distribution (see FIG. 4A to FIG. 4B) as a function representing a local field. "Edit" is assigned with a process of editing a function representing a local field. For example, "Edit" is assigned with a process of reading a file which defines a function representing a local field.

The input information acquirer (the input controller 11) acquires information related to a function representing the local scalar field input by the inputter (the input device 3). The field calculator 7A calculates the scalar field, using the information related to the function acquired by the input information acquirer (the input controller 11). As information which represents the specified function among the function candidates, the input controller 11 acquires input information input using the display device 2 (the GUI screen W).

The image processor 7 (for example, the field calculator 7A) generates a local scalar field on the basis of one or more pieces of point data of the point cloud data DG on the basis of the function set in the second setting sections. The image processor 7 (for example, the field calculator 7A) calculates the scalar field on the basis of local scalar fields by superposing the local scalar fields. The image processor 7 (for example, the surface generator 7B) calculates the isosurface of the scalar field on the basis of the local scalar fields and generates surface information.

The information related to the function mentioned above is information related to types of function. The information related to types of function mentioned above includes at least one of a function in which the value changes stepwise with respect to the distance from each point data, a function in which the value continuously changes with respect to the distance from each point data, and a function in which the value decreases with respect to the distance from each point data. The information related to types of function mentioned above may be a piece of information related to a threshold value of a function in which the value is constant in a region where the distance from each point data is equal to or greater than the threshold value.

The setting screen (for example, the GUI screen W) includes third setting sections (denoted by reference signs Q13 and Q14 in FIG. 13) to set information related to filters. As an item specified in the input information, the output controller 12 outputs to the GUI screen W "Filter" which indicates a filter used in calculating a function representing a scalar field. The output controller 12 displays "Gaussian", a button Q13, "Laplacian", a button Q14, and "Edit" at positions preliminarily set with respect to the position displayed as "Filter". The output controller 12 causes the display device 2 to display "Gaussian" and "Laplacian" as images showing the filter candidates.

The button Q13 is assigned with a process of specifying a Gaussian filter as a filter. The button Q14 is assigned with a process of specifying a Laplacian filter as a filter. "Edit" is assigned with a process of editing the function representing a filter. For example, "Edit" is assigned with a process of reading a file which defines the function representing a filter. The field calculator 7A superposes local scalar fields and applies a filter thereto to calculate the function representing a scalar field. The image processor 7 (for example, the field calculator 7A) superposes local scalar fields and applies the filter thereto on the basis of the information related to the filter set in the third setting sections. The image processor 7 (for example, the field calculator 7A) generates a scalar field by applying a filter to the function in which local scalar fields are superposed.

The input information acquirer (the input controller 11) acquires information related to the filter input by the inputter (the input device 3). The information related to the filter is a piece of information which specifies the function representing the filter (for example, "Gaussian", "Laplacian", and "Edit" of "Filter" in FIG. 13). The field calculator 7A calculates a scalar field, using the information related to the filter acquired by the input information acquirer (the input controller 11).

"Apply" is assigned with a process of reflecting the information of an item specified in the input information. "Cancel" is assigned with a process of reverting the information of the changed item. "OK" is assigned with a process of completing the setting. When the setting process described above is completed, the field calculator 7A calculates a function which represents a scalar field, using the function ("Function"), the radius ("radius (nm)"), and the filter ("Filter") specified in the input information. The surface generator 7B calculates surface information, on the basis of the scalar value ("iso value") and the resolution (resolution (nm)) specified in the input information, and the function representing the scalar field calculated by the field calculator 7A.

In the setting process, at least one of the scalar value ("iso value"), the radius ("radius (nm)"), and the resolution (resolution (nm)) can be set, and preliminarily set values (fixed values) may be used for the other parameters. In the setting process, one or both of the radius ("radius (nm)") and the resolution (resolution (nm)) need not be set. For example, the surface generator 7B may generate surface information, using a preliminarily set value (for example, a fixed value) for one or both of the radius ("radius (nm)") and the resolution (resolution (nm)). In the setting process, parameters other than the scalar value ("iso value"), the radius ("radius (nm)"), and the resolution (resolution (nm)) may be set.

In an additional setting process ("Advanced"), one or both of "Rectangle" and "Gaussian" need not be presented as candidates for a function ("Function") representing a local field. In the additional setting process ("Advanced"), a candidate different from "Rectangle" and "Gaussian" may be presented as a candidate for a function ("Function") representing a local field. In the additional setting process ("Advanced"), the process of specifying the function representing a local field need not be executed.

In the additional setting process ("Advanced"), one or both of "Gaussian" and "Laplacian" need not be presented as candidates for the function ("filter") representing a filter. In the additional setting process ("Advanced"), a candidate different from "Gaussian" and "Laplacian" may be presented as a candidate for the function ("filter") representing a filter. In the additional setting process ("Advanced"), the process of specifying the function representing a filter need not be executed. Furthermore, the additional setting process ("Advanced") need not be executed.

In the present embodiment, the surface generator 7B generates surface information, using, for example, a plurality of calculation conditions. The output controller 12 causes the display device 2 to display images representing surface information generated by the surface generator 7B. For example, when a left-click is detected as having been performed while the pointer P is being placed over "Thumbnail", the input controller 11 causes the output controller 12 to output the images (shown later in FIG. 14 to FIG. 16) representing the surface information (see FIG. 12 and FIG. 13).

In the case where at least one of the calculation conditions (for example, the specified value iso of the scalar value, the resolution d, and the radius r) is changed, the displayed images may be changed in real time. That is to say, even without "Apply" or "OK" being clicked (pressed), the surface generator 7B may generate surface information in real time, using the changed calculation conditions, and the output controller 12 may cause the display device 2 to display the images representing surface information and generated by the surface generator 7B.

Figure 14:
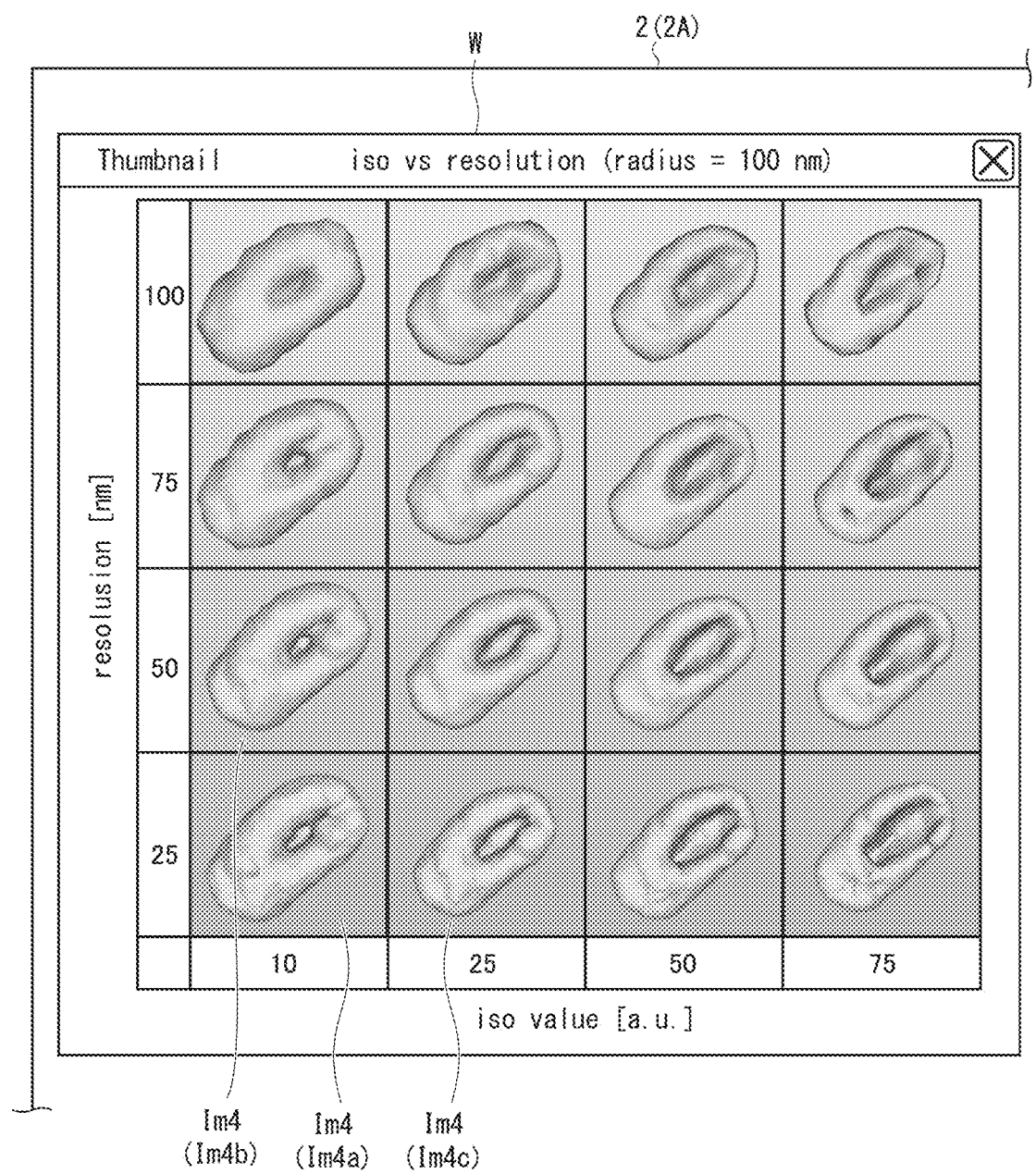
FIG. 14 is a diagram showing images displayed by the UI according to the first embodiment.

FIG. 14 is a diagram showing images displayed by the UI according to the first embodiment. In FIG. 14, a plurality of restored surface images Im4, for which the calculation conditions differ, are displayed in a form of a table on the GUI screen W. The horizontal axis of this table corresponds to the specified value of scalar value ("iso value"). For example, among the plurality of restored surface images Im4, a restored surface image Im4a and a restored surface image Im4b in the same column are of the same specified value of scalar value (for example, "10"). Among the plurality of images Im4, the image Im4a and an image Im4c in different columns are of different specified values of scalar value (for example, "10", "25").

The output controller 12 causes the display device 2 (the GUI screen W) to display, in an arranged manner, a first restored surface image (for example, the image Im4a) representing surface information calculated using a first calculation condition, and a second restored surface image (for example, an image Im4c) representing surface information calculated using a second calculation condition, which is different from the first calculation condition. The first calculation condition differs from the second calculation condition in the scalar value in scalar field.

The vertical axis of the table corresponds to the specified value of resolution ("resolution"). For example, the image Im4a and the image Im4c in the same row are of the same specified value of resolution (for example, "25"). The restored surface image Im4a and the restored surface image Im4b in different rows are of different specified values of resolution (for example, "25", "50"). The output controller 12 causes the display device 2 (the GUI screen W) to display, in an arranged manner, the first restored surface image (for example, the image Im4a) representing surface information calculated using the first calculation condition, and the second restored surface image (for example, an image Im4b) representing surface information calculated using the second calculation condition, which is different from the first calculation condition. The first calculation condition differs from the second calculation condition in the specified value of resolution.

Figure 15:
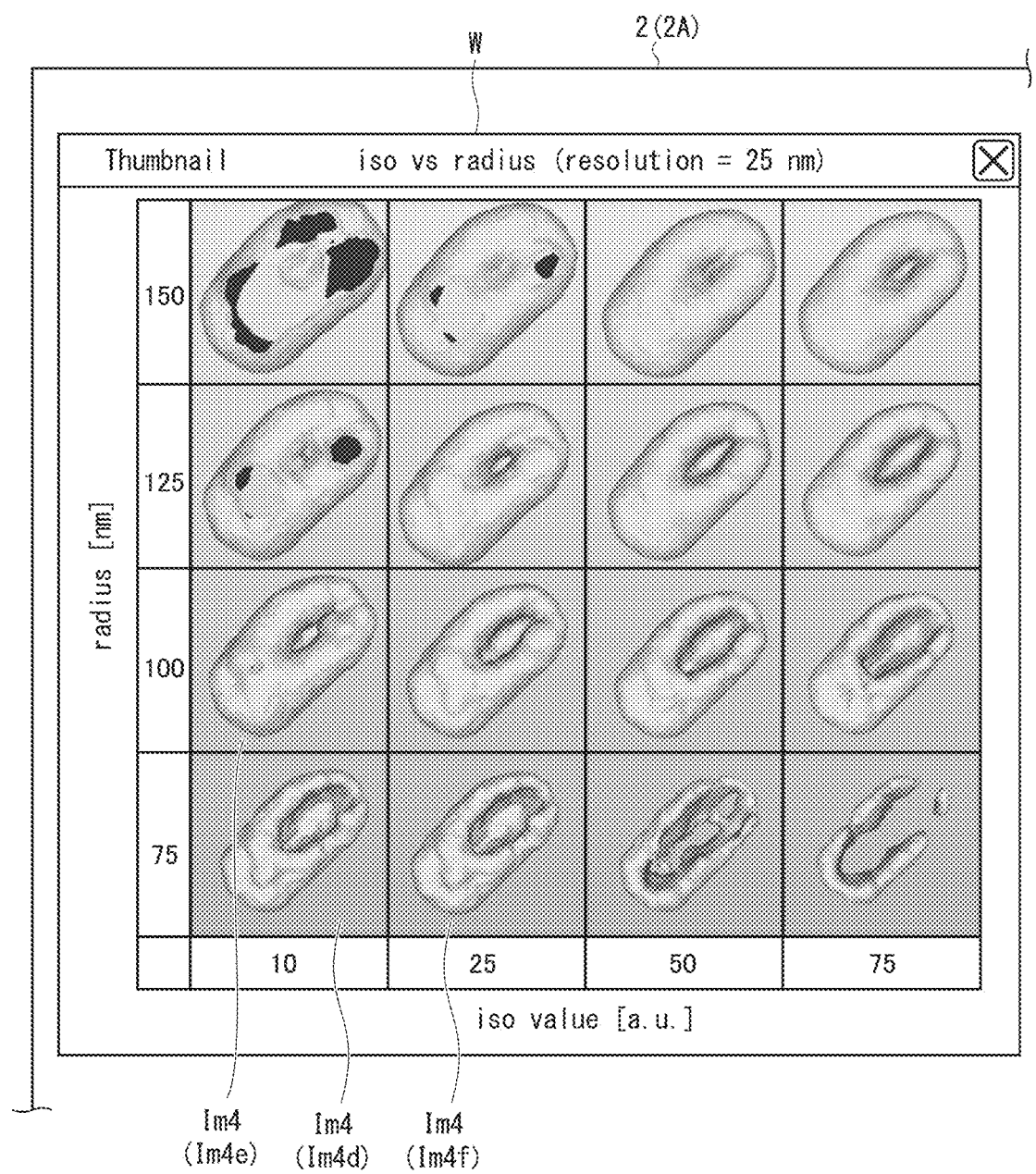
FIG. 15 is a diagram showing images displayed by the UI according to the first embodiment.

FIG. 15 is a diagram showing images displayed by the UI according to the first embodiment. In FIG. 15, a plurality of restored surface images Im4, for which calculation conditions differ, are displayed in a form of a table on the GUI screen W. The horizontal axis of this table corresponds to the specified value of scalar value ("iso value"). For example, among the plurality of restored surface images Im4, a restored surface image Im4d and a restored surface image Im4e in the same column are of the same specified value of scalar value (for example, "10"). Among the plurality of images Im4, the restored surface image Im4d and a restored surface image Im4f in different columns are of different specified values of scalar value (for example, "10", "25"). The output controller 12 causes the display device 2 (the GUI screen W) to display, in an arranged manner, the first restored surface image (for example, the restored surface image Im4d) representing surface information calculated using the first calculation condition, and the second restored surface image (for example, the restored surface image Im4f) representing surface information calculated using the second calculation condition, which is different from the first calculation condition. The first calculation condition differs from the second calculation condition in the scalar value in scalar field.

The vertical axis of the table corresponds to the specified value of radius ("radius"). For example, the restored surface image Im4d and the restored surface image Im4f in the same row are of the same specified value of radius (for example, "75"). The restored surface image Im4d and the restored surface image Im4e in different rows are of different specified values of radius (for example, "75", "100"). The output controller 12 causes the display device 2 (the GUI screen W) to display, in an arranged manner, the first restored surface image (for example, the restored surface image Im4d) representing restored surface information calculated using the first calculation condition, and the second restored surface image (for example, the restored surface image Im4e) representing surface information calculated using the second calculation condition, which is different from the first calculation condition. The first calculation condition differs from the second calculation condition in the specified value of radius.

Figure 16:
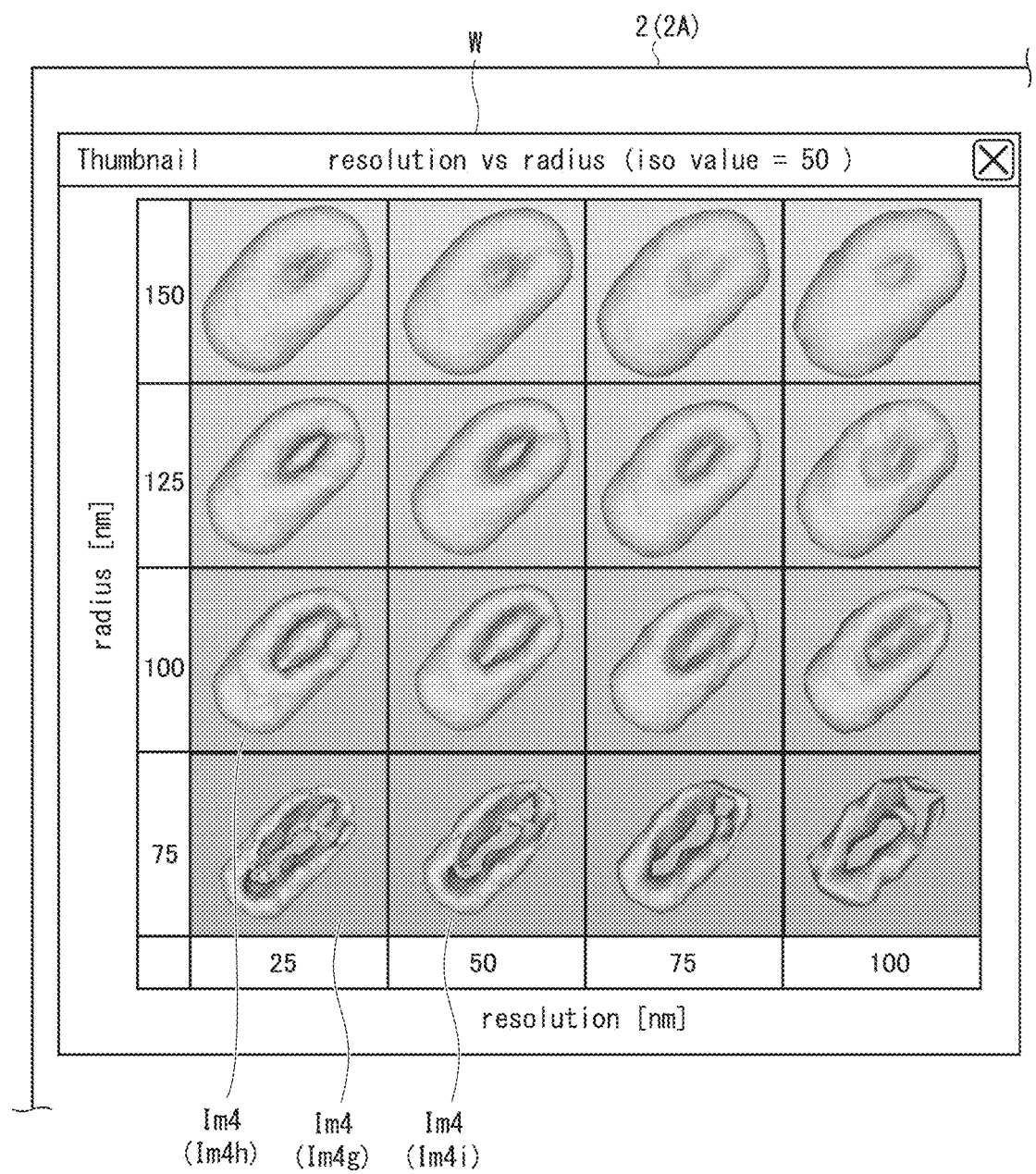
FIG. 16 is a diagram showing images displayed by the UI according to the first embodiment.

FIG. 16 is a diagram showing images displayed by the UI according to the first embodiment. In FIG. 16, a plurality of restored surface images Im4, for which calculation conditions differ, are displayed in a form of a table on the GUI screen W. The horizontal axis of the table corresponds to the specified value of resolution ("resolution"). For example, among the plurality of restored surface images Im4, a restored surface image Im4g and a restored surface image Im4h in the same column are of the same specified value of resolution (for example, "25"). Among the plurality of images Im4, the image Im4g and an image Im4i in different columns are of different specified values of resolution (for example, "25", "50"). The output controller 12 causes the display device 2 (the GUI screen W) to display, in an arranged manner, the first restored surface image (for example, the image Im4g) representing surface information calculated using the first calculation condition, and the second restored surface image (for example, the image Im4i) representing surface information calculated using the second calculation condition, which is different from the first calculation condition. The first calculation condition differs from the second calculation condition in the specified value of resolution.

The vertical axis of the table corresponds to the specified value of radius ("radius"). For example, the restored surface image Im4g and the restored surface image Im4i in the same row are of the same specified value of radius (for example, "75"). The restored surface image Im4g and the restored surface image Im4h in different rows are of different specified values of radius (for example, "75", "100"). The output controller 12 causes the display device 2 (the GUI screen W) to display, in an arranged manner, the first restored surface image (for example, the restored surface image Im4g) representing surface information calculated using the first calculation condition, and the second restored surface image (for example, the restored surface image Im4h) representing restored surface information calculated using the second calculation condition, which is different from the first calculation condition. The first calculation condition differs from the second calculation condition in the specified value of radius.

The information processing device 1 displays the plurality of restored surface images Im4 obtained under different calculation conditions in the arranged manner as described above. The user can, for example, compare the plurality of restored surface images Im4 and select calculation conditions suitable for extracting a target structure. For example, the surface generator 7B generates surface information candidates under a plurality of conditions with different parameter values related to generating surface information (for example, "resolution (nm)", "iso value"), and generates a plurality of images representing the surface information candidates (for example, the restored surface images such as the image Im4a and the image Im4b in FIG. 14). In the case where an instruction to set parameters is input on the setting screen (for example, the GUI screen W of FIG. 13) (for example, where "Thumbnail" is selected), the display controller (the output controller 12) causes the display (the display device 2) to display the image Im4a and the image Im4b as shown in FIG. 14. The display controller (the output controller 12) displays the image Im4a and the image Im4b as samples of images representing surface information.

By selecting an image from the plurality of images (surface information candidates) displayed on the display (the display device 2), the user can specify the parameter value corresponding to the selected image as a parameter related to generating surface information. The image processor 7 (the field calculator 7A and the surface generator 7B) generates surface information, using the parameter value corresponding to the image selected from the plurality of images displayed on the display (the display device 2). The display controller (the output controller 12) causes the display (the GUI screen W of FIG. 13) to display the parameter value corresponding to the selected image, and an image which represents the surface information generated using the parameter value corresponding to the selected image. Thus, the display controller (the output controller 12) may cause the display (the display device 2) to display, in a selectable manner, an image representing first surface information, an image representing second surface information, an image representing third surface information, and an image representing fourth surface information. The display controller (the output controller 12) may cause the setting screen to display the calculation condition corresponding to the image selected from the images displayed on the display (the display device 2).

Prior to performing parameter setting using the image candidates of FIG. 14, the display controller (the output controller 12) causes the display (for example, the GUI screen W in FIG. 13) to display the first image (for example, the restored surface image Im3 of FIG. 13) generated using the first calculation condition of the first parameter. After the first parameter has been set to the second calculation condition using the image candidate of FIG. 14, the display controller (the output controller 12) causes the display (for example, the GUI screen W of FIG. 13) to display, instead of the first image, the second image (for example, the image Im4a of FIG. 14) generated by the image processor 7 using the second calculation condition of the second parameter.

In the case where an instruction to set parameters is input on the setting screen (for example, the GUI screen W of FIG. 13) (for example, where "Thumbnail" is selected), the input controller 11 may accept from the user an input specifying the types of parameters to be set. For example, in the case where "iso value" and "resolution" are specified as the types of parameters to be set, as shown in FIG. 14, the output controller 12 may display a plurality of images in which the parameters are different. In the case where "iso value" and "radius" are specified as the types of parameters to be set, as shown in FIG. 15, the output controller 12 may display a plurality of images in which the parameters are different. In the case where "radius" and "resolution" are specified as the types of parameters to be set, as shown in FIG. 16, the output controller 12 may display a plurality of images in which the parameters are different. There are two types of parameters to be set in FIG. 14 to FIG. 16, however, there may be one type of parameter, or three or more types of parameters.

In the case where the first calculation condition is set on the setting screen (the GUI screen W), the image processor 7 (for example, the surface generator 7B) may generate the first surface information on the basis of point cloud data, using the first calculation condition. The display controller (the output controller 12) may cause the display (the display device 2) to display the image representing the first surface information. In the case where the second calculation condition is set on the setting screen (the GUI screen W), the image processor 7 (for example, the surface generator 7B) may generate the second surface information on the basis of point cloud data, using the second calculation condition. The display controller (the output controller 12) may cause the display to display an image representing the first surface information (for example, the image Im3) and an image representing the second surface information (not shown in the drawings). The display controller (the output controller 12) may display the first image representing the first surface information and the second image representing the second surface information simultaneously. The display controller (the output controller 12) may display the image representing the first surface information and the image representing the second surface information in a switchable manner.

The image processor 7 (for example, the surface generator 7B) may generate a third image using a third calculation condition of the second parameter, which is different from the first parameter, and may generate a fourth image using a fourth calculation condition of the second parameter. The display controller may also display the third image and the fourth image. For example, in the case where the first parameter is "iso value" and the second parameter is "resolution", the display controller (the output controller 12) may display the third image and the fourth image as shown in FIG. 14. In the case where the first parameter is "iso value" and the second parameter is "radius", the display controller (the output controller 12) may display the third image and the fourth image as shown in FIG. 15. In the case where the first parameter is "resolution" and the second parameter is "radius", the display controller (the output controller 12) may display the third image and the fourth image as shown in FIG. 16.

The above scalar value ("iso value") may be set on the basis of the density (numerical density, crude density) of points in the point set represented by the point cloud data DG. For example, there are some cases where a region having a relatively high numerical density of points in the point cloud data DG and a region having a relatively low numerical density of points are both present. In such a case, it is possible, by lowering "iso value", to detect the region having a relatively high numerical density of points and the region having a relatively low numerical density of points. It is also possible, by increasing "iso value", to remove the region having a relatively low numerical density of points to detect (extract) the region having a relatively high numerical density of points. In the case where the region having a relatively low numerical density of points is a noise region, noise can be removed by increasing "iso value".

In the case where there is an obvious noise (a region with hardly any surrounding points) which can be recognized by visually observing the point cloud image Im1 of FIG. 11, the noise can be preliminarily removed by specifying the noise region on the point cloud image Im1. The image processor 7 may generate surface information after the noise has been removed. The value of the field near the noise may be reduced by applying a filter (for example, a smoothing filter) to the field, to thereby remove the noise.

The display device 2 may be able to display an image three-dimensionally by means of a parallax image. In such a case, the output controller 12 may cause the display device 2 to display a parallax image. A printer which forms a three-dimensional structure may be connected to the information processing device 1. In such a case, the output controller 12 may output three-dimensional shape information obtained from surface information to the printer to form the three-dimensional structure.

Figure 17:
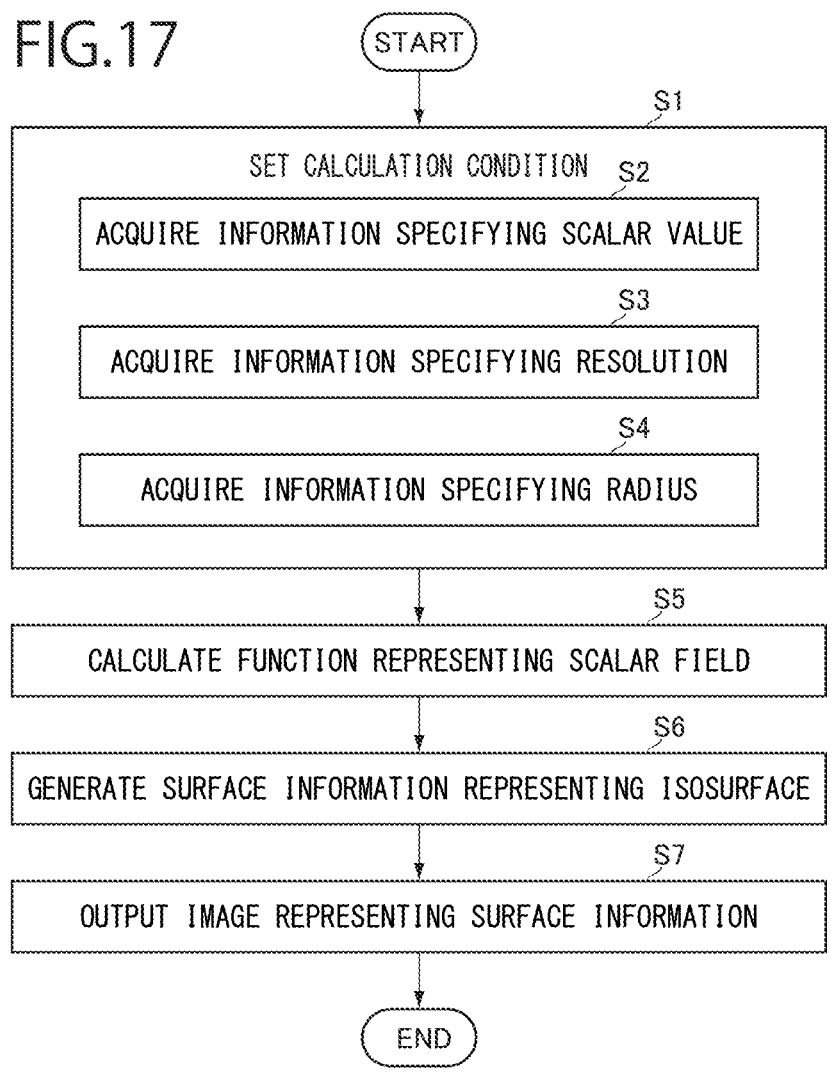
FIG. 17 is a flowchart showing an information processing method according to the first embodiment.

Next, an information processing method according to the embodiment will be described, on the basis of the operation of the information processing device 1 described above. FIG. 17 is a flowchart showing the information processing method according to the first embodiment. In Step S1, the information processing device 1 sets parameters (calculation conditions). For example, as described in FIG. 11 to FIG. 13, the UI 6 sets a parameter used for calculating a function representing a scalar field FS (for example, "radius"), the function representing local fields (for example, "function"), and the function representing a filter (for example, "filter"). The UI 6 sets parameters (for example, "resolution", "iso value") used for generating surface information. For example, in Step S2, the input controller 11 acquires information which specifies the scalar value. In Step S3, the input controller 11 acquires information which specifies the resolution. In Step S4, the input controller 11 acquires information which specifies the radius.

The processes of Step S2 to Step S4 may be executed in any order. When a preliminarily set value is used as the resolution, the process of Step S3 need not be executed. When a preliminarily set value is used as the radius, the process of Step S4 need not be executed.

In Step S5, the field calculator 7A calculates a function which represents scalar fields (see FIG. 3A to FIG. 3D). The field calculator 7A calculates a function representing scalar fields, using the information acquired by the input controller 11 in Step S1. The field calculator 7A stores the calculated function representing scalar fields in the memory storage 9. In Step S6, the surface generator 7B generates surface information representing an isosurface (see FIG. 5, FIG. 6A to FIG. 6E, FIG. 7, FIG. 8A to FIG. 8C, FIG. 9A to FIG. 9D, FIG. 10A, and FIG. 10B). The surface generator 7B generates the surface information using the information acquired by the input controller 11 in Step S1. The surface generator 7B stores the generated surface information in the memory storage 9.

In Step S7, the information processing device 1 outputs an image representing the surface information (see FIG. 14 to FIG. 17). For example, the output controller 12 outputs image data to the display device 2, on the basis of input information from the user who specifies to output the image representing the surface information. The output controller 12 reads out the surface information stored in the memory storage 9 by the surface generator 7B, and causes the display device 2 (for example, the GUI screen W) to display the image representing the surface information. The output controller 12 displays the image showing the shape of a region surrounded by an isosurface as an image showing the surface information.

The information processing method according to the embodiment includes: causing the display to display the setting screen to set the calculation conditions used for generating surface information; generating surface information on the basis of point cloud data, using the calculation conditions set in the setting screen; and causing the display to display an image representing the generated surface information. The information processing method according to the embodiment may include: generating the first surface information, using the first calculation condition of the first parameter on the basis of the point cloud data; generating the second surface information, using the second calculation condition of the first parameter on the basis of the point cloud data; and causing the display to display an image representing the first surface information and an image representing the second surface information. The information processing method according to the embodiment may include: calculating a scalar field on the basis of point cloud data; acquiring a scalar value input by the inputter; and calculating the isosurface of a scalar field on the basis of the acquired scalar value to generate surface information.

Second Embodiment

Figure 18:
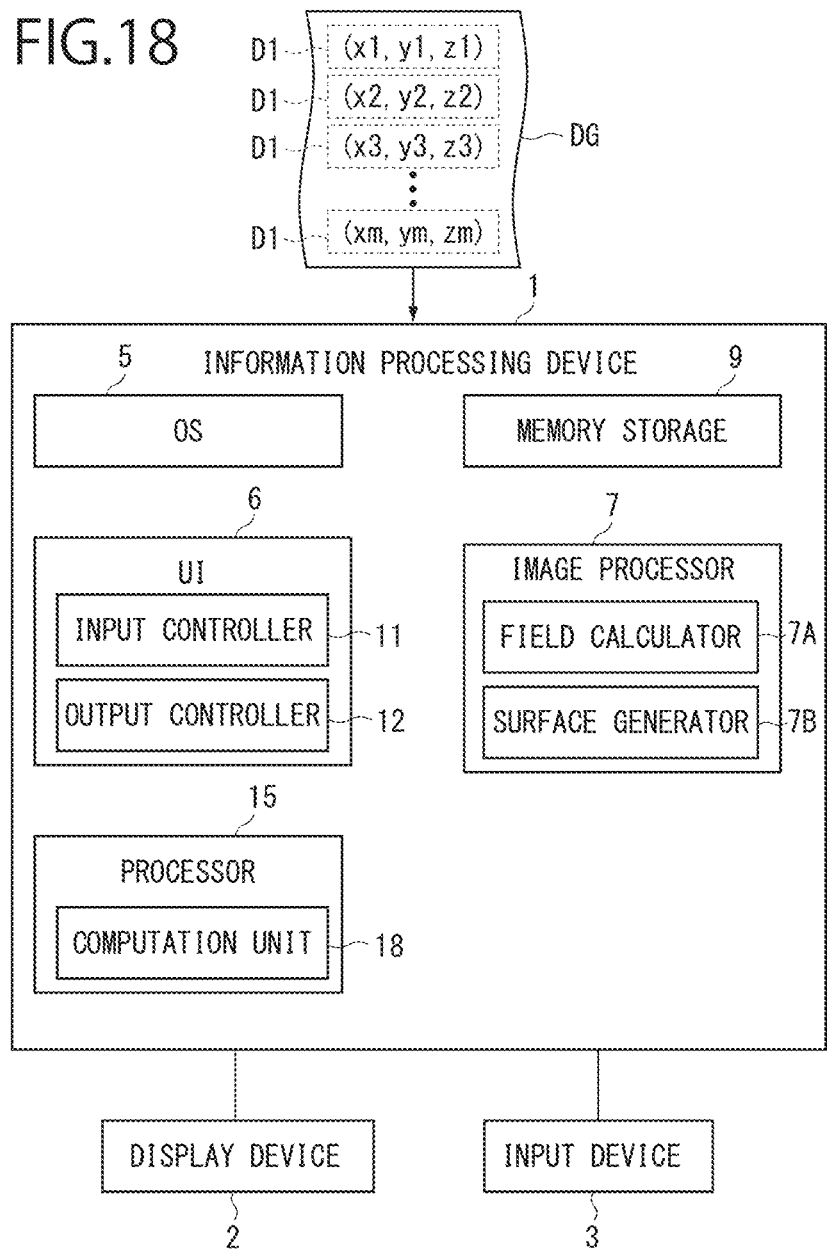
FIG. 18 is a diagram showing an information processing device according to a second embodiment.

Next, a second embodiment will be described. In the present embodiment, the same reference signs are given to the same configurations as those in the embodiment described above, and the descriptions thereof will be omitted or simplified. FIG. 18 is a diagram showing an information processing device according to a second embodiment. A processor 15 includes a computation unit 18. The computation unit 18 computes at least one of: the area of an isosurface; the volume of a space surrounded by an isosurface; the linear distance between two points on an isosurface; the geodetic distance between two points on an isosurface; the distance between the centroid of a structure in a specified first region and the centroid of a structure in a specified second region; and the degree of similarity between a first isosurface and a second isosurface represented by surface information.

Figure 19:
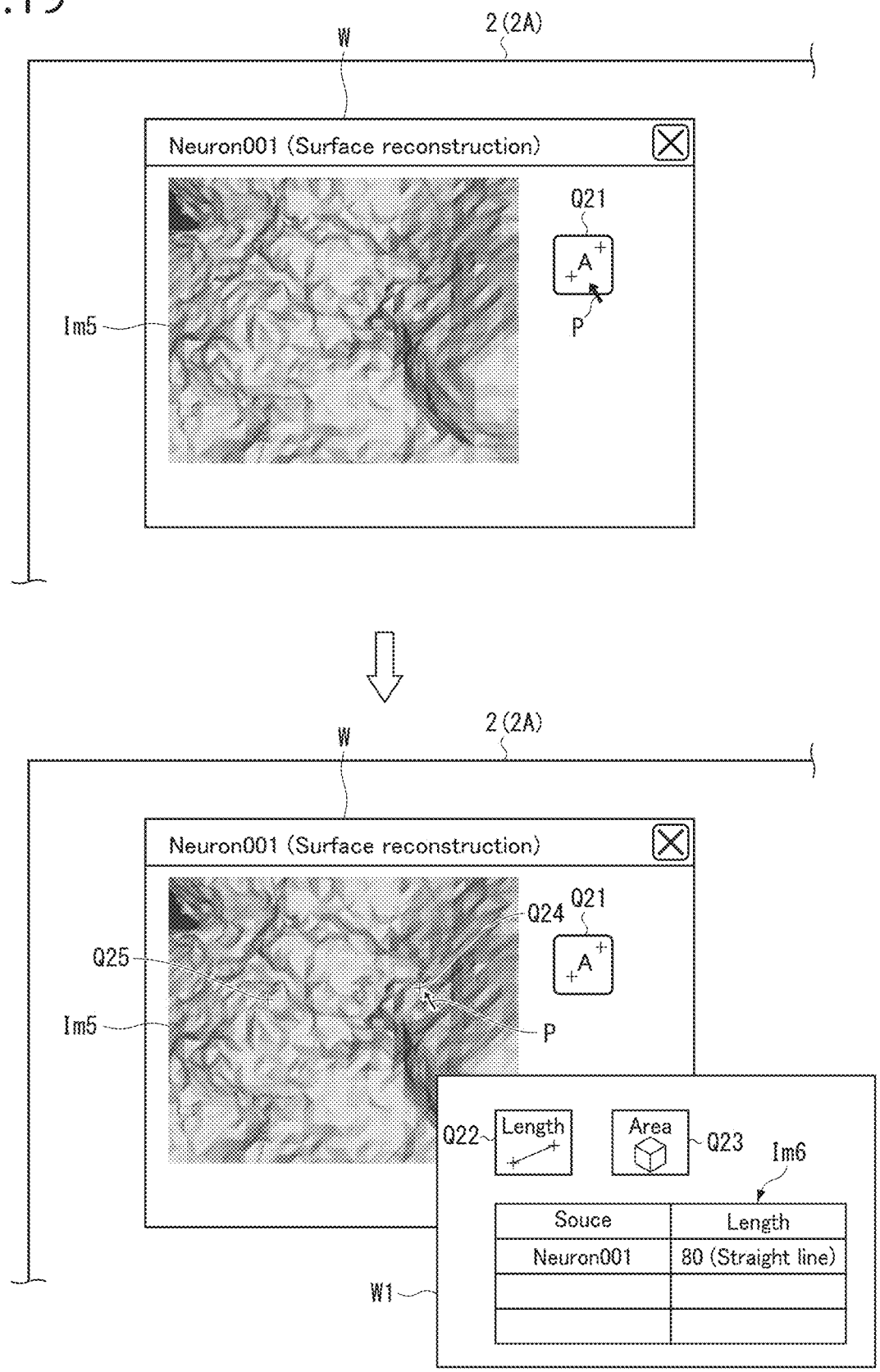
FIG. 19 is a diagram showing a process of a UI according to the second embodiment.

FIG. 19 to FIG. 24 are diagrams showing processes of the processor and the UI according to the second embodiment. First, the process of computing distance by means of the computation unit 18 will be described. In FIG. 19, the GUI screen W is displaying a restored surface image Im5 representing the surface information generated by the surface generator 7B, and a button Q21. The button Q21 is assigned with a process of acquiring, as input information, a condition for the processing performed by the computation unit 18. The output controller 12 displays the button Q21 in the GUI screen W on the basis of GUI information. When a left-click is detected as having been performed while the pointer P is being placed over the button Q21, the input controller 11 causes the output controller 12 to generate a window W1.

A button Q22, a button Q23, and an image Im6 are displayed in the window W1. The button Q22 is assigned with a process of causing the computation unit 18 to execute distance calculation. When a left-click is detected as having been performed while the pointer P is being placed over the button Q22, the input controller 11 accepts, as input information, information which specifies a position in the image Im5. When a left-click is detected as having been performed while the pointer P is being placed over the image Im5, the input controller 11 acquires the position of the pointer P as the position of a first point specified by the user. The input controller 11 causes the output controller 12 to display a mark Q24 at the acquired position of the pointer P. Similarly, when a left-click is detected as having been performed while the pointer P is being placed over the image Im5, the input controller 11 acquires the position of the pointer P as the position of a second point specified by the user. The input controller 11 causes the output controller 12 to display a mark Q25 at the acquired position of the pointer P.

When the position of the first point (see the mark Q24) and the position of the second point (see the mark Q25) have been acquired, the input controller 11 causes the computation unit 18 to compute the linear distance between the first point and the second point. The computation unit 18 reads out surface information stored in the memory storage 9 to compute the linear distance between the first point and the second point. An image Im6 is an image showing computation results of the computation unit 18. Here, it is assumed that the linear distance between the first point and the second point computed by the computation unit 18 is 80 nm. The output controller 12 reflects a computation result of the computation unit 18 (for example, "80 (Straight line)") on the image Im6.

Figure 20:
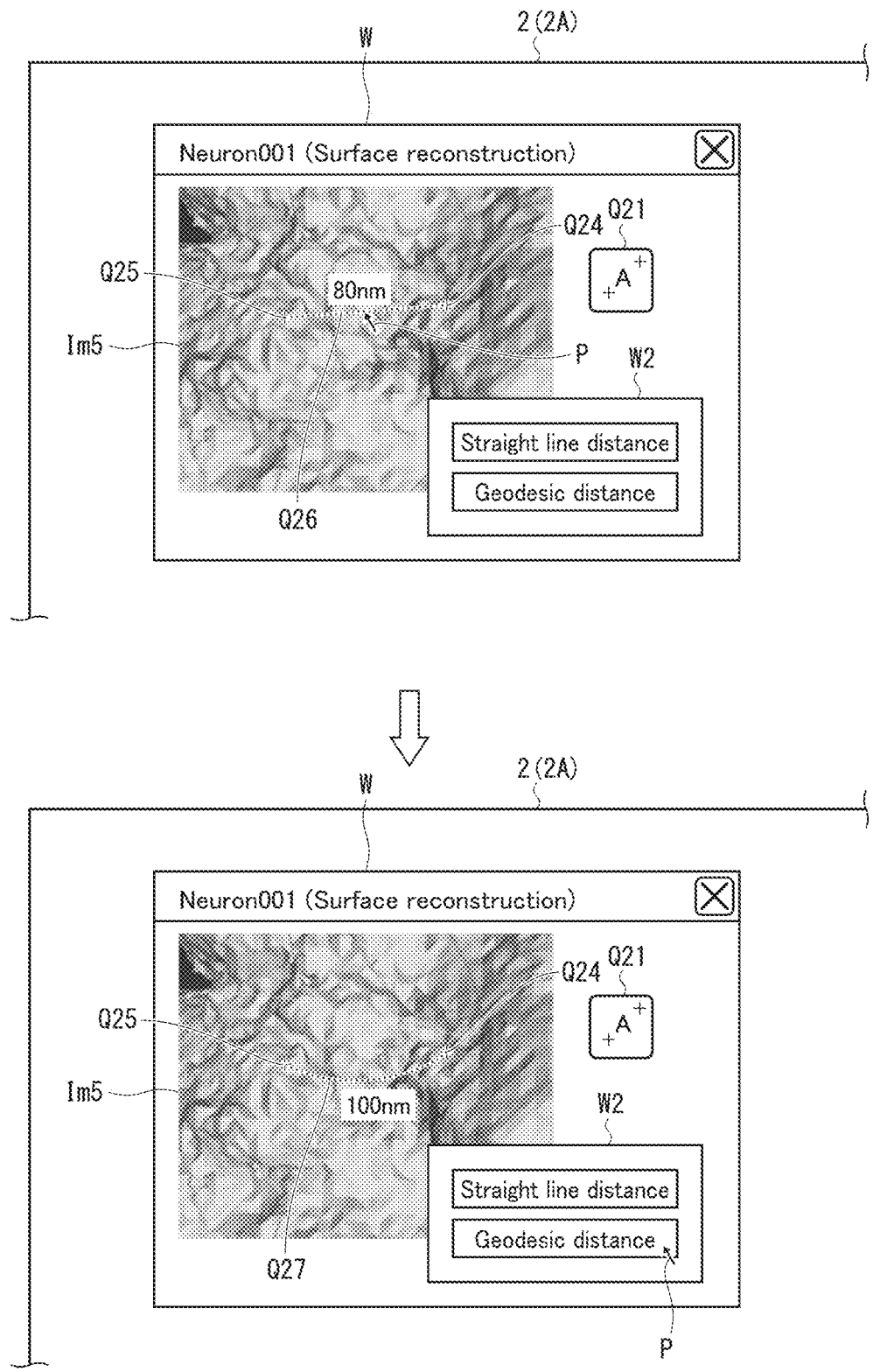
FIG. 20 is a diagram showing a process of the UI according to the second embodiment.

As shown in FIG. 20, the output controller 12 displays on the image Im5 a line Q26 connecting the mark Q24 and the mark Q25 and a computation result (for example, "80 nm") of the computation unit 18. When a right-click is detected as having been performed while the pointer P is being placed over the line Q26, the input controller 11 causes the output controller 12 to execute a process of generating a window W2. A button labeled "Straight line distance" and a button labeled "Geodesic distance" are displayed in the window W2. The "Straight line distance" button is assigned with a process of specifying to compute a linear distance. The "Geodesic distance" button is assigned with a process of specifying to compute a geodesic distance.

When a left-click is detected as having been performed while the pointer P is being placed over "Geodesic distance", the input controller 11 causes the computation unit 18 to compute the geodetic distance between the first point and the second point. The computation unit 18 reads out surface information stored in the memory storage 9 to compute the geodetic distance between the first point and the second point. Here, it is assumed that the geodetic distance between the first point and the second point computed by the computation unit 18 is 100 nm. The output controller 12 displays on the image Im5 a geodesic line Q27 connecting the mark Q24 and the mark Q25 and a computation result (for example, "100 nm") of the computation unit 18. The output controller 12 reflects the computation result of the computation unit 18 on the image Im6 shown in the lower figure of FIG. 19. For example, the output controller 12 displays "100 nm (Geodesic line)" in the "Length" column.

Figure 21:
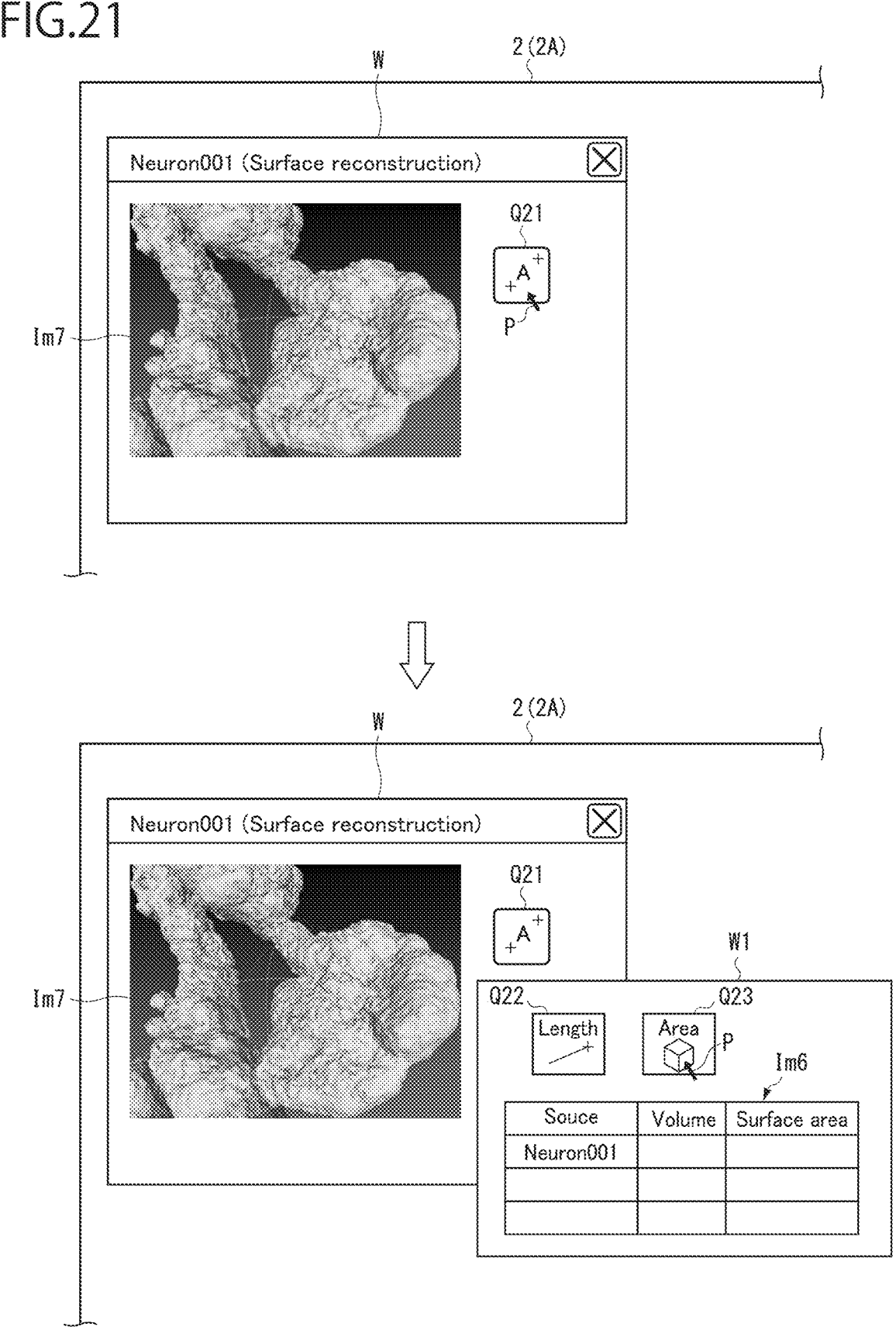
FIG. 21 is a diagram showing a process of the UI according to the second embodiment.

Next, a process of computing a volume and an area by means of the computation unit 18 will be described. In FIG. 21, the GUI screen W is displaying an image Im7 representing the surface information generated by the surface generator 7B, and a button Q21. The button Q21 is assigned with a process of acquiring, as input information, a condition for the processing performed by the computation unit 18. The output controller 12 displays the button Q21 in the GUI screen W on the basis of GUI information. When a left-click is detected as having been performed while the pointer P is being placed over the button Q21, the input controller 11 causes the output controller 12 to generate the window W1.

The button Q22, the button Q23, and the image Im6 are displayed in the window W1. The button Q23 is assigned with a process of causing the computation unit 18 to execute computation of a volume and an area. When a left-click is detected as having been performed while the pointer P is being placed over the button Q23, the input controller 11 accepts, as input information, information which specifies a region AR2 (see FIG. 22) in the image Im7.

When a left-click is detected as having been performed while the pointer P is being placed over the image Im7, the input controller 11 acquires the position of the pointer P as the position of a vertex of the region specified by the user. When the pointer P is detected as having performed a drag while being placed over the image Im7, the input controller 11 determines the region AR2 on the basis of the movement amount of the pointer P. The input controller 11 causes the computation unit 18 to compute the volume of a space (a region) surrounded by an isosurface in the determined region AR2. The computation unit 18 reads out surface information stored in the memory storage 9 and computes the volume of the space surrounded by the isosurface in the region AR2. The input controller 11 causes the computation unit 18 to compute the area of the isosurface in the region AR2. The area of an isosurface corresponds to the surface area of an object (a region) surrounded by the isosurface. The computation unit 18 reads out surface information stored in the memory storage 9 and computes the volume of the area of the isosurface in the region AR2.

The image Im6 is an image showing computation results of the computation unit 18. Here, it is assumed that the volume computed by the computation unit 18 is 4186 $nm^3$. The output controller 12 reflects the computation result of the computation unit 18 on the image Im6, and displays "4186" in the "Volume" column. The output controller 12 reflects the computation result of the computation unit 18 on the image Im7, and displays "4186 $nm^3$" near the region AR2. It is assumed that the area computed by the computation unit 18 is 1256 $nm^2$. The output controller 12 reflects the computation result of the computation unit 18 on the image Im6, and displays "1256" in the "Surface area" column.

Figure 22:
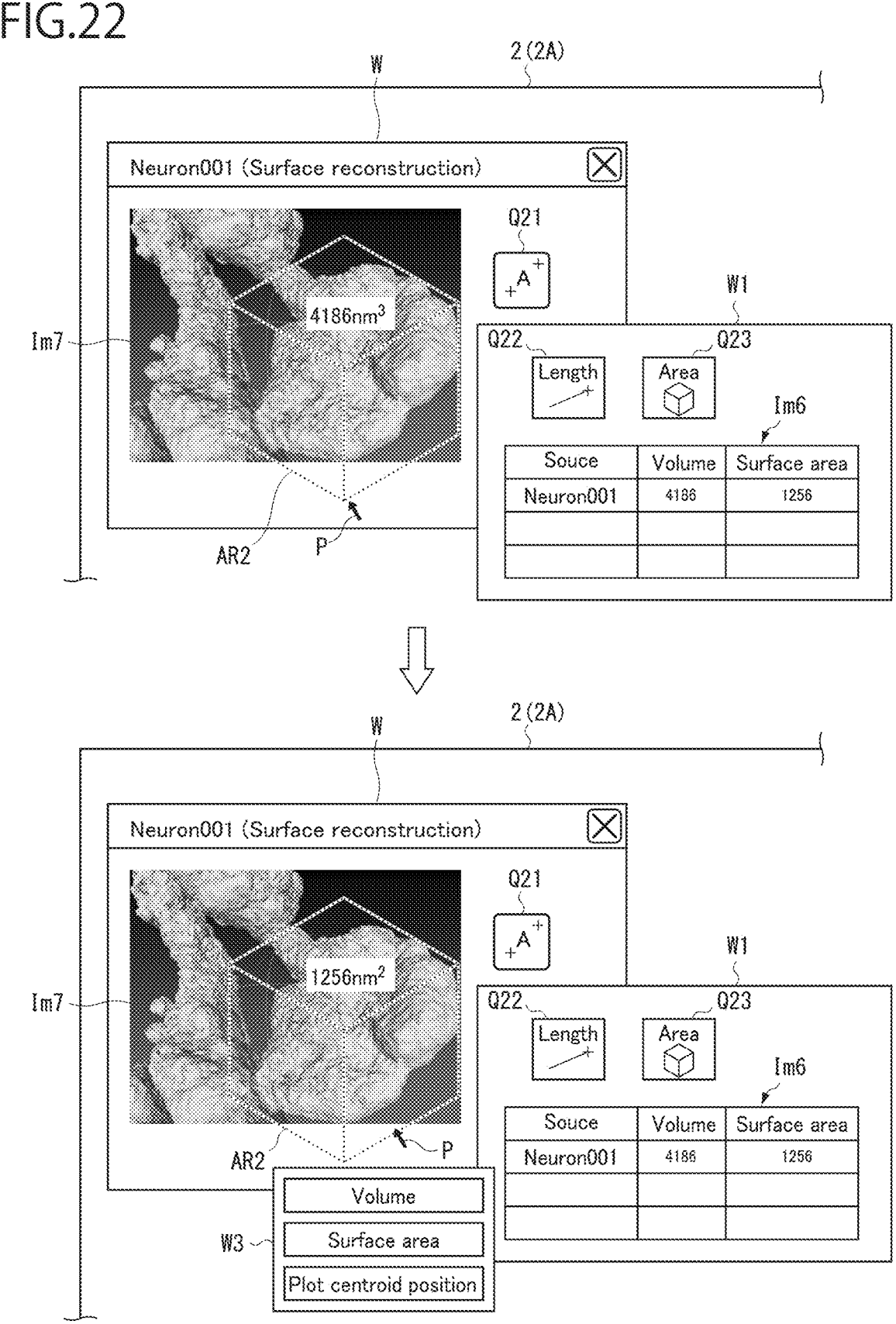
FIG. 22 is a diagram showing a process of the UI according to the second embodiment.

As shown in the lower figure of FIG. 22, when a right-click is detected as having been performed while the pointer P is being placed over the outer periphery of the region AR2, the input controller 11 causes the output controller 12 to generate a window W3. "Volume", "Surface area", and "Plot centroid position" are displayed in the window W3. "Volume" is assigned with a process of displaying the volume computed by the computation unit 18 on the image Im6. "Surface area" is assigned with a process of displaying the area computed by the computation unit 18 on the image Im7. When a left-click is detected as having been performed while the pointer P is being placed over "Surface area", the input controller 11 displays "1256 nm$^2$" near the region AR2.

Figure 23:
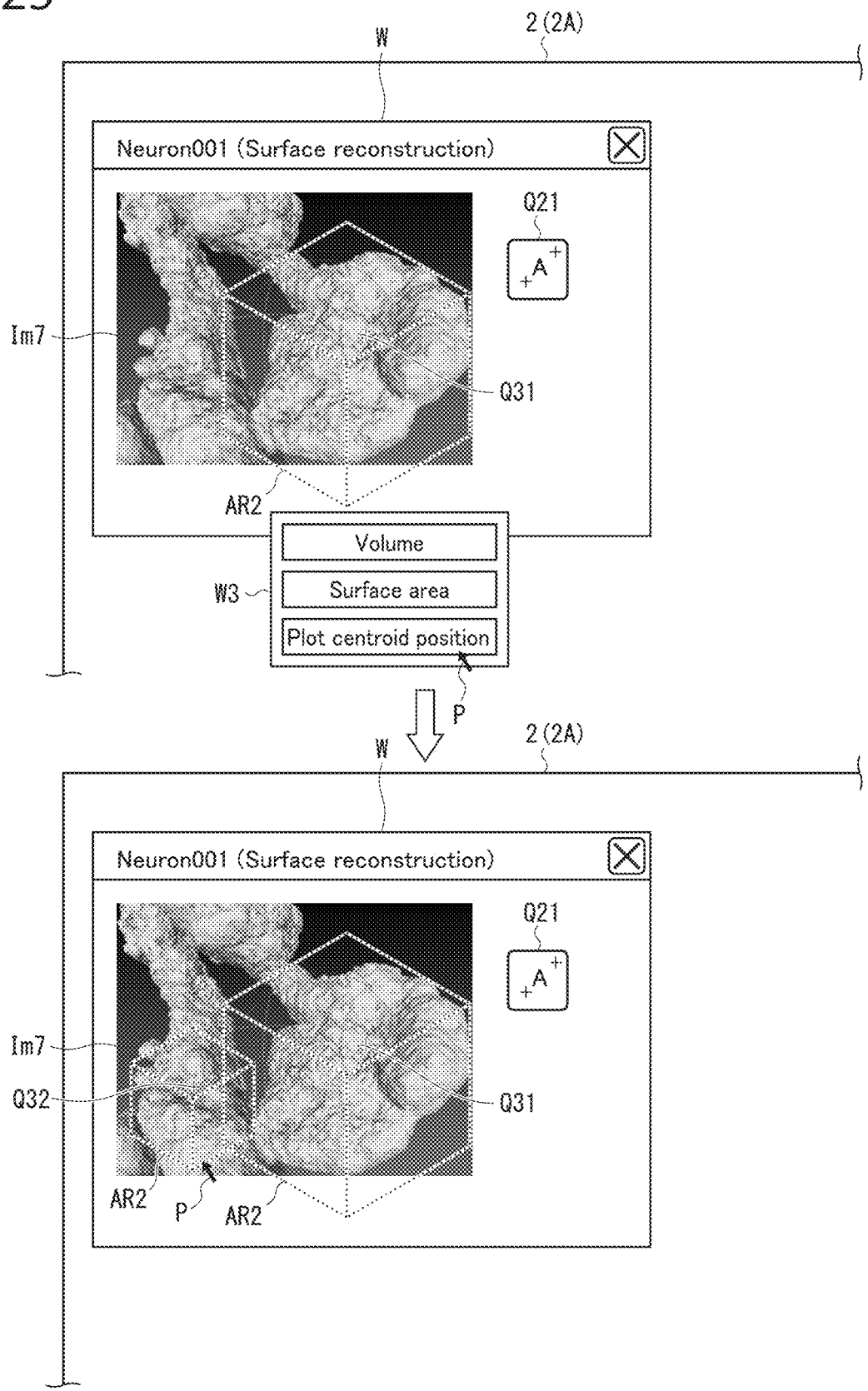
FIG. 23 is a diagram showing a process of the UI according to the second embodiment.

As shown in FIG. 23, when a left-click is detected as having been performed while the pointer P is being placed over "Plot centroid position", the input controller 11 causes the computation unit 18 to compute the centroid of a space surrounded by an isosurface in the region AR2. The computation unit 18 reads out surface information stored in the memory storage 9 and calculates the position of the centroid corresponding to the region AR2. The output controller 12 displays a mark Q31 at a position on the image Im7 corresponding to the centroid computed by the computation unit 18.

The output controller 12 accepts information which specifies a region AR3 (see the lower figure of FIG. 23). The user can specify the region AR3 in a manner similar to that in the case of specifying the region AR2. When the region AR3 is specified, the input controller 11 causes the computation unit 18 to compute a centroid corresponding to the region AR3 as with the case of the region AR2. The output controller 12 displays a mark Q32 at a position on the image Im7 corresponding to the centroid computed by the computation unit 18.

Figure 24:
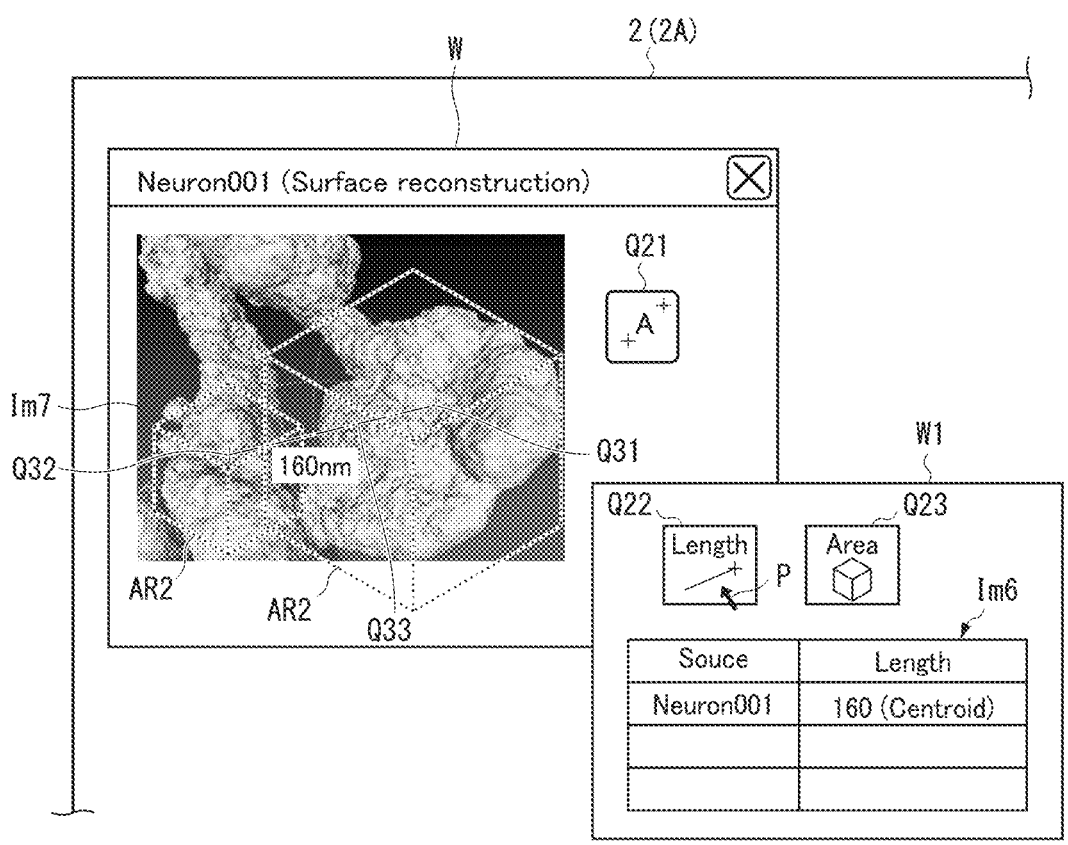
FIG. 24 is a diagram showing a process of the UI according to the second embodiment.

The input controller 11 causes the output controller 12 to generate the window W1 shown in FIG. 24. When a left-click is detected as having been performed while the pointer P is being placed over the button Q22, the input controller 11 causes the computation unit 18 to compute the linear distance between the centroid (the mark Q31) corresponding to the region AR2 and the centroid (the mark Q32) corresponding to the region AR3. The computation unit 18 reads out surface information stored in the memory storage 9 to compute the linear distance between the centroids. Here, it is assumed that the linear distance between the centroids computed by the computation unit 18 is 160 nm. The output controller 12 displays on the image Im7 a line Q33 connecting the mark Q31 and the mark Q32 and the computation result (for example, "160 nm") of the computation unit 18. The output controller 12 reflects the computation result of the computation unit 18 on the image Im6 in the window W1. For example, the output controller 12 displays "160 nm (Centroid)" in the "Length" column.

In the embodiment described above, the information processing device 1 includes, for example, a computer system. The information processing device 1 reads out an information processing program stored in the memory storage 9, and executes various processes in accordance with the information processing program. This information processing program causes a computer to execute processes of: causing the display to display the setting screen to set the calculation conditions used for generating surface information; generating surface information on the basis of point cloud data, using the calculation conditions set in the setting screen; and causing the display to display an image representing the generated surface information. The information processing program according to the embodiment may be a program which causes a computer to execute processes of: generating the first surface information, using the first calculation condition of the first parameter on the basis of the point cloud data; generating the second surface information, using the second calculation condition of the first parameter on the basis of the point cloud data; and causing the display to display an image representing the first surface information and an image representing the second surface information. The information processing program according to the embodiment may be a program which causes a computer to execute processes of: calculating a scalar field on the basis of point cloud data; acquiring a scalar value input by the inputter; and calculating the isosurface of the scalar field on the basis of the acquired scalar value to generate surface information. The information processing program according to the embodiment may be recorded and provided on a computer-readable memory storage medium (for example, a non-transitory recording medium, or a non-transitory tangible medium).

Microscope

Figure 25:
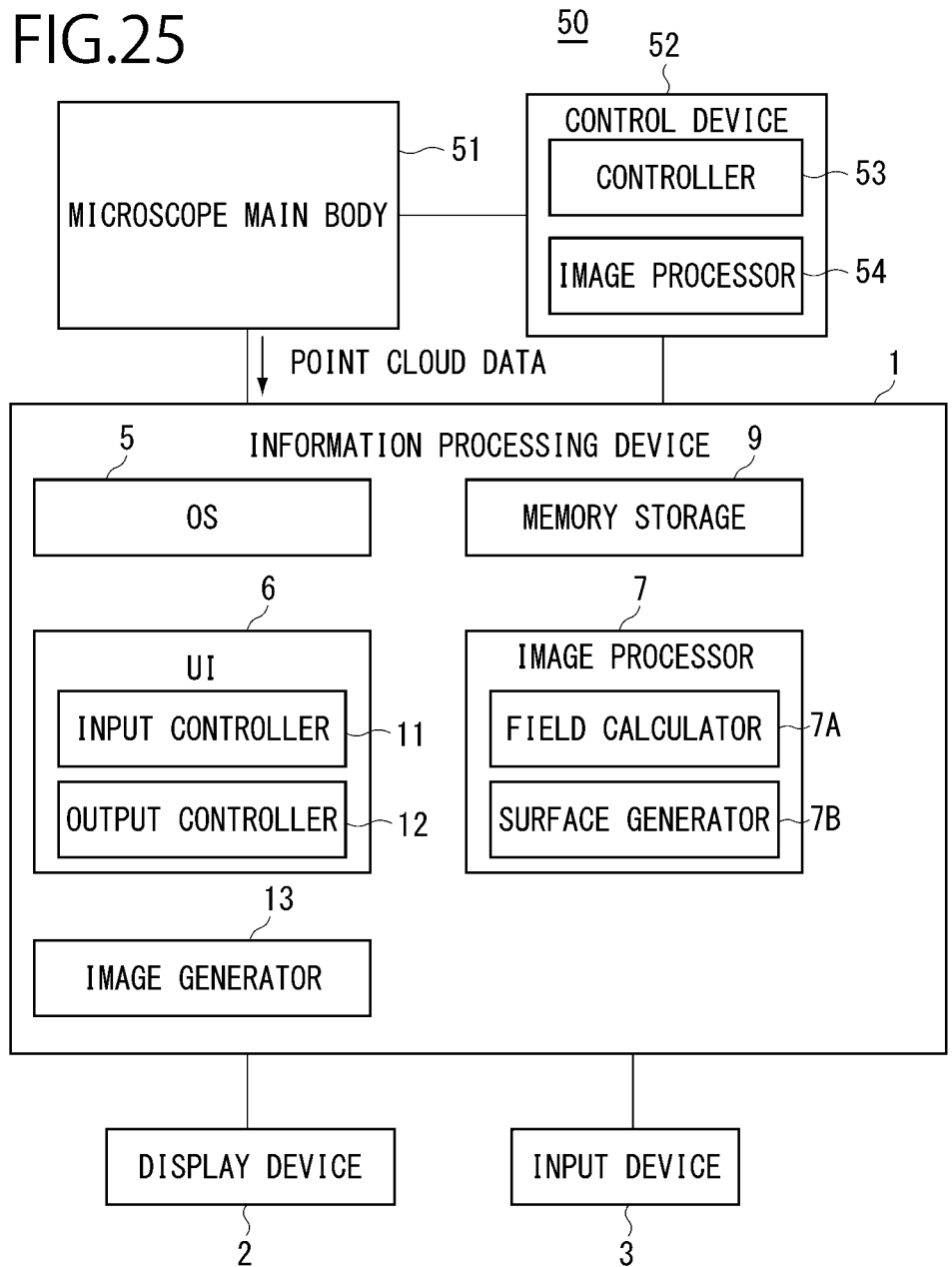
FIG. 25 is a diagram showing a microscope according to the embodiment.

Next, a microscope according to the embodiment will be described. In the present embodiment, the same reference signs are given to configurations similar to those in the embodiment described above, and the descriptions thereof will be omitted or simplified. FIG. 25 is a diagram showing the microscope according to the embodiment. A microscope 50 includes a microscope main body 51, the information processing device 1 described in the embodiment described above, and a control device 52. The control device 52 includes a controller 53 which controls each part of the microscope main body 51, and an image processor 54. At least apart of the control device 52 may be provided in (may be built-in) the microscope main body 51. The controller 53 controls the information processing device 1. At least a part of the control device 52 may be provided in (may be built-in) the information processing device 1.

The microscope main body 51 detects an image of fluorescence emitted from a sample containing a fluorescent substance. The microscope main body 51 is, for example, a STORM, a PALM, or the like which uses a method of single-molecule localization microscopy. In a STORM, a plurality of fluorescent images are acquired by activating a fluorescent substance and irradiating the activated fluorescent substance with an excitation light. The data of the plurality of fluorescence images are input to the information processing device 1. The image generator 13 calculates position information of the fluorescent substance in each fluorescent image, and generates point cloud data DG, using a plurality of pieces of the calculated position information. The image generator 13 generates the point cloud image Im1 representing the point cloud data DG. In the case of a two-dimensional STORM, the image generator 13 calculates two-dimensional position information of a fluorescent substance and generates point cloud data DG including a plurality of pieces of two-dimensional data. In the case of a three-dimensional STORM, the image generator 13 calculates three-dimensional position information of a fluorescent substance and generates point cloud data DG including a plurality of pieces of three-dimensional data.

Figure 26:
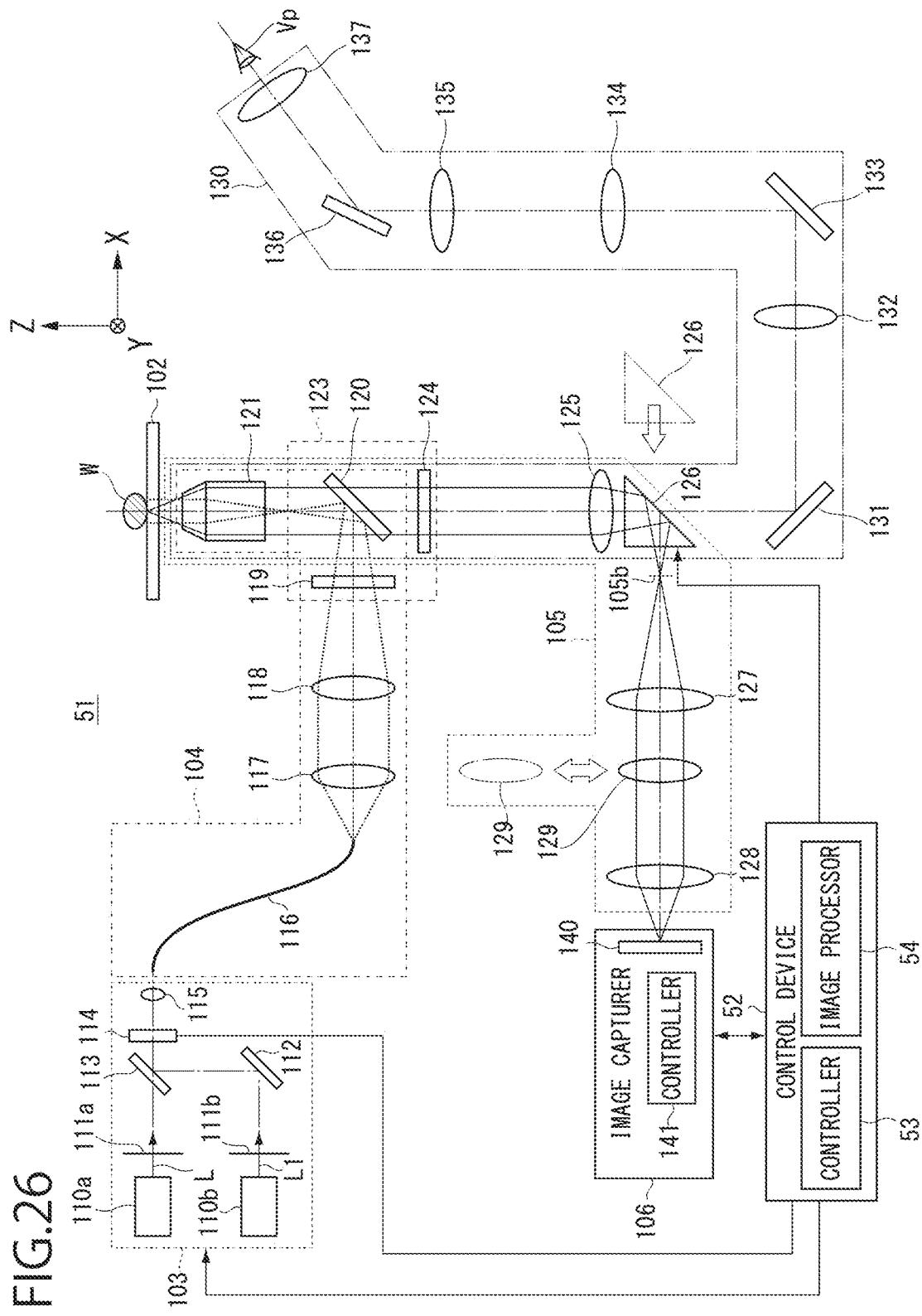
FIG. 26 is a diagram showing a microscope main body according to the embodiment.

FIG. 26 is a diagram showing the microscope main body according to the embodiment. The microscope main body 51 can be used for both fluorescence observation of a sample labeled with one type of fluorescent substance and fluorescence observation of a sample labeled with two or more types of fluorescent substances. In the present embodiment, it is assumed that one type of fluorescent substance (for example, a reporter dye) is used for labeling. The microscope 50 can generate a three-dimensional super-resolution image. For example, the microscope 50 has a mode for generating a two-dimensional super-resolution image and a mode for generating a three-dimensional super-resolution image, and can switch between the two modes.

The sample may contain live cells or cells that are fixed using a tissue fixative solution such as formaldehyde solution, or may contain tissues or the like. The fluorescent substance may be a fluorescent dye such as cyanine dye, or a fluorescent protein. The fluorescent dye includes a reporter dye that emits fluorescence upon receiving excitation light in a state of being activated (hereinafter, referred to as activated state). The fluorescent dye may contain an activator dye that brings the reporter dye into the activated state upon receiving activating light. When the fluorescent dye does not contain an activator dye, the reporter dye is brought into the activated state upon receiving the activation light. Examples of the fluorescent dye include a dye pair in which two types of cyanine dyes are bound (such as Cy3-Cy5 dye pair (Cy3, Cy5 are registered trademarks), Cy2-Cy5 dye pair (Cy2, Cy5 are registered trademarks), and Cy3-Alexa Fluor 647 dye pair (Cy3, Alexa Fluor are registered trademarks)), and a type of dye (such as, Alexa Fluor 647 (Alexa Fluor is a registered trademark)). Examples of the fluorescent protein include PA-GFP and Dronpa.

The microscope main body 51 includes a stage 102, a light source device 103, an illumination optical system 104, a first observation optical system 105, and an image capturer 106. The stage 102 holds a sample W to be observed. The stage 102 can, for example, have the sample placed on an upper surface thereof. The stage 102 may have, for example, a mechanism for moving the sample W as seen with an XY stage or may not have a mechanism for moving the sample W as seen with a desk or the like. The microscope main body 51 need not include the stage 102.

The light source device 103 includes an activation light source 110a, an excitation light source 110b, a shutter 111a, and a shutter 111b. The activation light source 110a emits an activation light L which activates a part of the fluorescent substance contained in the sample W. Here, the fluorescent substance contains a reporter dye and contains no activator dye. The reporter dye of the fluorescent substance is brought into the activated state capable of emitting fluorescence by irradiating the activation light L thereon. The fluorescent substance may contain a reporter dye and an activator dye, and in such a case the activator dye activates the reporter dye upon receiving the activation light L. The fluorescent substance may be a fluorescent protein such as PA-GFP or Dronpa.

The excitation light source 110b emits an excitation light L1 which excites at least a part of the activated fluorescent substance in the sample W. The fluorescent substance emits fluorescence or is inactivated when the excitation light L1 is irradiated thereon in the activated state. When the fluorescent substance is irradiated with the activation light L in the inactive state (hereunder, referred to as inactivated state), the fluorescent substance is activated again.

The activation light source 110a and the excitation light source 110b include, for example, a solid-state light source such as a laser light source, and each emit a laser light of a wavelength corresponding to the type of fluorescent substance. The emission wavelength of the activation light source 110a and the emission wavelength of the excitation light source 110b are selected, for example, from approximately 405 nm, approximately 457 nm, approximately 488 nm, approximately 532 nm, approximately 561 nm, approximately 640 nm, and approximately 647 nm. Here, it is assumed that the emission wavelength of the activation light source 110a is approximately 405 nm and the emission wavelength of the excitation light source 110b is a wavelength selected from approximately 488 nm, approximately 561 nm, and approximately 647 nm.

The shutter 111a is controlled by the controller 53 and is capable of switching between a state of allowing the activation light L from the activation light source 110a to pass therethrough and a state of blocking the activation light L. The shutter 111b is controlled by the controller 53 and is capable of switching between a state of allowing the excitation light L1 from the excitation light source 110b to pass therethrough and a state of blocking the excitation light L1.

The light source device 103 includes a mirror 112, a dichroic mirror 113, an acousto-optic element 114, and a lens 115. The mirror 112 is provided, for example, on an emission side of the excitation light source 110b. The excitation light L1 from the excitation light source 110b is reflected on the mirror 112 and enters the dichroic mirror 113. The dichroic mirror 113 is provided, for example, on an emission side of the activation light source 110a. The dichroic mirror 113 has a characteristic of transmitting the activation light L therethrough and reflecting the excitation light L1 thereon. The activation light L transmitted through the dichroic mirror 113 and the excitation light L1 reflected on the dichroic mirror 113 enter the acousto-optic element 114 through the same optical path.

The acousto-optic element 114 is, for example, an acousto-optic filter. The acousto-optic element 114 is controlled by the controller 53 and can adjust the light intensity of the activation light L and the light intensity of the excitation light L1, respectively. The acousto-optic element 114 is controlled by the controller 53 and is capable of switching between a state of allowing both the activation light L and the excitation light L1 to pass therethrough (hereunder, referred to as light-transmitting state) and a state of blocking or reducing the intensity of the activation light L and the excitation light L1 (hereunder, referred to as light-blocking state). For example, when the fluorescent substance contains a reporter dye and contains no activator dye, the controller 53 controls the acousto-optic element 114 so that the activation light L and the excitation light L1 are simultaneously irradiated. When the fluorescent substance contains the reporter dye and contains no activator dye, the controller 53 controls the acousto-optic element 114 so that the excitation light L1 is irradiated after the irradiation of the activation light L, for example. The lens 115 is, for example, a coupler, and focuses the activation light L and the excitation light L1 from the acousto-optic element 114 on a light guide 116.

The microscope main body 51 need not include at least a part of the light source device 103. For example, the light source device 103 may be unitized and may be provided exchangeably (in an attachable and detachable manner) on the microscope main body 51. For example, the light source device 103 may be attached to the microscope main body 51 at the time of performing an observation by means of the microscope 1.

The illumination optical system 104 irradiates the activation light L, which activates a part of the fluorescent substance contained in the sample W, and the excitation light L1, which excites at least a part of the activated fluorescent substance. The illumination optical system 104 irradiates the sample W with the activation light L and the excitation light L1 from the light source device 103. The illumination optical system 104 includes the light guide 116, a lens 117, a lens 118, a filter 119, a dichroic mirror 120, and an objective lens 121.

The light guide 116 is, for example, an optical fiber, and guides the activation light L and the excitation light L1 to the lens 117. In FIG. 1 and so forth, the optical path from the emission end of the light guide 116 to the sample W is shown with a dotted line. The lens 117 is, for example, a collimator, and converts the activation light L and the excitation light L1 into parallel lights. The lens 118 focuses, for example, the activation light L and the excitation light L1 on a pupil plane of the objective lens 121. The filter 119 has a characteristic, for example, of transmitting the activation light L and the excitation light L1 and blocking at least a part of lights of other wavelengths. The dichroic mirror 120 has a characteristic of reflecting the activation light L and the excitation light L1 thereon and transmitting light of a predetermined wavelength (for example, fluorescence) among the light from the sample W. The light from the filter 119 is reflected on the dichroic mirror 120 and enters the objective lens 121. The sample W is placed on a front side focal plane of the objective lens 121 at the time of observation.

The activation light L and the excitation light L1 are irradiated onto the sample W by means of the illumination optical system 104 as described above. The illumination optical system 104 mentioned above is an example, and changes may be made thereto where appropriate. For example, a part of the illumination optical system 104 mentioned above may be omitted. The illumination optical system 104 may include at least a part of the light source device 103. Moreover, the illumination optical system 104 may also include an aperture diaphragm, an illumination field diaphragm, and so forth.

The first observation optical system 105 forms an image of light from the sample W. Here, the first observation optical system 105 forms an image of fluorescence from the fluorescent substance contained in the sample W. The first observation optical system 105 includes the objective lens 121, the dichroic mirror 120, a filter 124, a lens 125, an optical path switcher 126, a lens 127, and a lens 128. The first observation optical system 105 shares the objective lens 121 and the dichroic mirror 120 with the illumination optical system 104. In FIG. 1 and so forth, the optical path between the sample W and the image capturer 106 is shown with a solid line.

The fluorescence from the sample W travels through the objective lens 121 and the dichroic mirror 120 and enters the filter 124. The filter 124 has a characteristic of selectively allowing light of a predetermined wavelength among the light from the sample W to pass therethrough. The filter 124 blocks, for example, illumination light, external light, stray light and the like reflected on the sample W. The filter 124 is unitized with, for example, the filter 119 and the dichroic mirror 120 as a filter unit 23, and the filter unit 23 is provided interchangeably. For example, the filter unit 23 may be exchanged according to the wavelength of the light emitted from the light source device 103 (for example, the wavelength of the activation light L, the wavelength of the excitation light L1), and the wavelength of the fluorescence emitted from the sample W. Alternatively, a single filter unit corresponding to a plurality of excitation and fluorescence wavelengths may be used.

The light having passed through the filter 124 enters the optical path switcher 126 via the lens 125. The light leaving the lens 125 forms an intermediate image on an intermediate image plane 105*b* after having passed through the optical path switcher 126. The optical path switcher 126 is, for example, a prism, and is provided in a manner that allows it to be inserted into and retracted from the optical path of the first observation optical system 105. The optical path switcher 126 is inserted into or retracted from the optical path of the first observation optical system 105 by means of a driver (not shown in the drawings) which is controlled by the controller 53. The optical path switcher 126 guides the fluorescence from the sample W to the optical path toward the image capturer 106 by means of internal reflection, in a state of having been inserted into the optical path of the first observation optical system 105.

The lens 127 converts the fluorescence leaving from the intermediate image (the fluorescence having passed through the intermediate image plane 105*b*) into parallel light, and the lens 128 focuses the light having passed through the lens 127. The first observation optical system 105 includes an astigmatic optical system (for example, a cylindrical lens 129). The cylindrical lens 129 acts at least on a part of the fluorescence from the sample W to generate astigmatism for at least a part of the fluorescence. That is to say, the astigmatic optical system such as the cylindrical lens 129 generates astigmatism with respect at least to a part of the fluorescence to generate an astigmatic difference. This astigmatism is used, for example, to calculate the position of the fluorescent substance in a depth direction of the sample W (an optical axis direction of the objective lens 121).

The cylindrical lens 129 is provided in a manner that allows it to be inserted into or retracted from the optical path between the sample W and the image capturer 106 (for example, an image-capturing element 140). For example, the cylindrical lens 129 can be inserted into or retracted from the optical path between the lens 127 and the lens 128. The cylindrical lens 129 is arranged in this optical path in the mode for generating a three-dimensional super-resolution image, and is retracted from this optical path in the mode for generating a two-dimensional super-resolution image.

In the present embodiment, the microscope main body 51 includes a second observation optical system 130. The second observation optical system 130 is used to set an observation range and so forth. The second observation optical system. 130 includes, in an order toward a view point Vp of the observer from the sample W, the objective lens 121, the dichroic mirror 120, the filter 124, the lens 125, a mirror 131, a lens 132, a mirror 133, a lens 134, a lens 135, a mirror 136, and a lens 137.

The second observation optical system 130 shares the configuration from the objective lens 121 to the lens 125 with the first observation optical system 105. After having passed through the lens 125, the fluorescence from the sample W enters the mirror 131 in a state where the optical path switcher 126 is retracted from the optical path of the first observation optical system 105. The light reflected on the mirror 131 enters the mirror 133 via the lens 132, and after having been reflected on the mirror 133, the light enters the mirror 136 via the lens 134 and the lens 135. The light reflected on the mirror 136 enters the view point Vp via the lens 137. The second observation optical system 130 forms an intermediate image of the sample W in the optical path between the lens 135 and the lens 137 for example. The lens 137 is, for example, an eyepiece lens, and the observer can set an observation range by observing the intermediate image therethrough.

The image capturer 106 image-captures an image formed by the first observation optical system 105. The image capturer 106 includes an image-capturing element 140 and a controller 141. The image-capturing element 140 is, for example, a CMOS image sensor, but may also be a CCD image sensor or the like. The image-capturing element 140 has, for example, a plurality of two-dimensionally arranged pixels, and is of a structure in which a photoelectric conversion element such as photodiode is arranged in each of the pixels. For example, the image-capturing element 140 reads out the electrical charges accumulated in the photoelectric conversion element by means of a readout circuit. The image-capturing element 140 converts the read electrical charges into digital data, and outputs digital format data in which the pixel positions and the gradation values are associated with each other (for example, image data). The controller 141 causes the image-capturing element 140 to operate on the basis of a control signal input from the controller 53, and outputs data of the captured image to the control device 52. Also, the controller 141 outputs to the control device 52 an electrical charge accumulation period and an electrical charge readout period.

On the basis of a signal (image capturing timing information) indicating the electrical charge accumulation period and the electrical charge readout period supplied from the controller 141, the controller 53 supplies to the acousto-optic element 114 a control signal for switching between the light-transmitting state where the light from the light source device 103 is allowed to pass through and the light-blocking state where the light from the light source device 103 is blocked. The acousto-optic element 114 switches between the light-transmitting state and the light-blocking state on the basis of this control signal. The controller 53 controls the acousto-optic element 114 to control the period during which the sample W is irradiated with the activation light L and the period during which the sample W is not irradiated with the activation light L. The controller 53 controls the acousto-optic element 114 to control the period during which the sample W is irradiated with the excitation light L1 and the period during which the sample W is not irradiated with the excitation light L1. The controller 53 controls the acousto-optic element 114 to control the light intensity of the activation light L and the light intensity of the excitation light L1 which are irradiated onto the sample W.

In place of the controller 53, on the basis of a signal (image capturing timing information) indicating the electrical charge accumulation period and the electrical charge readout period, the controller 141 may supply to the acousto-optic element 114 a control signal for switching between the light-transmitting state and the light-blocking state to thereby control the acousto-optic element 114.

The controller 53 controls the image capturer 106 to cause the image-capturing element 140 to execute image capturing. The control device 52 acquires an image-capturing result (captured image data) from the image capturer 106. The image processor 54 calculates position information of the fluorescent substance in each fluorescent image by calculating the centroid of the fluorescent image in the captured image, and uses the calculated position information to generate point cloud data DG. In the case of a two-dimensional STORM, the image processor 54 calculates two-dimensional position information of a fluorescent substance and generates point cloud data DG including a plurality of pieces of two-dimensional data. In the case of a three-dimensional STORM, the image processor 54 calculates three-dimensional position information of a fluorescent substance and generates point cloud data DG including a plurality of pieces of three-dimensional data.

The image processor 54 outputs the point cloud data DG to the information processing device 1 shown in FIG. 24. The information processing device 1 processes the point cloud data DG obtained from the detection result of the microscope main body 51. The control device 52 may acquire the image capturing result (captured image data) from the image capturer 106 and may output the acquired image capturing result to the information processing device 1, and the information processing device 1 may generate the point cloud data DG. In such a case, as described above, the image generator 13 of the information processing device 1 calculates the position information of the fluorescent substance of each fluorescent image, and generates the point cloud data DG using a plurality of pieces of the calculated position information. The image generator 13 generates the point cloud image Im1 representing the point cloud data DG. In the case of a two-dimensional STORM, the image generator 13 calculates two-dimensional position information of a fluorescent substance and generates point cloud data DG including a plurality of pieces of two-dimensional data. In the case of a three-dimensional STORM, the image generator 13 calculates three-dimensional position information of a fluorescent substance and generates point cloud data DG including a plurality of pieces of three-dimensional data.

An observation method according to the present embodiment includes: irradiating an activation light for activating a part of a fluorescent substance contained in a sample; irradiating an excitation light to excite at least a part of the activated fluorescent substance; image-capturing an image of light from a sample; calculating position information of the fluorescent substance, on the basis of an image capturing result obtained as a result of image capturing; generating point cloud data, using the calculated position information; and processing the generated point cloud data by means of the information processing method according to the embodiment. For example, the control device 52 controls the microscope main body 51, and thereby, the microscope main body 51 detects an image of fluorescence emitted from a sample containing a fluorescent substance. The control device 52 controls the microscope main body 51 to generate point cloud data. The control device 52 controls the information processing device 1 to cause the field calculator 7A to calculate a function representing a scalar field. The control device 52 controls the information processing device 1 to cause the UI 6 to acquire user input information including the information which specifies the scalar value in the scalar field. The control device 52 controls the information processing device 1 to cause the surface generator 7B to generate surface information representing the isosurface of the scalar value corresponding to the input information.

In the embodiment described above, the control device 52 includes, for example, a computer system. The control device 52 reads out an observation program stored in the memory storage and executes various processes according to the observation program. This observation program causes a computer to execute: control of irradiating an activation light for activating a part of a fluorescent substance contained in a sample; control of irradiating an excitation light to excite at least a part of the activated fluorescent substance; control of image-capturing an image of light from a sample; calculating position information of the fluorescent substance, on the basis of an image capturing result obtained as a result of image capturing; generating point cloud data, using the calculated position information; and processing the generated point cloud data. This observation program may be recorded and provided on a computer-readable storage medium (for example, a non-transitory recording medium, or a non-transitory tangible medium).

The technical scope of the present invention is not limited to the modes described in the above embodiment and so forth. One or more of the requirements described in the above embodiments and so forth may be omitted. One or more of the requirements described in the above embodiments and so forth may also be combined where appropriate.

Furthermore, the contents of all documents cited in the detailed description of the present invention are incorporated herein by reference to the extent permitted by law.

DESCRIPTION OF REFERENCE SIGNS

1 Information processing device
2 Display device (display)
3 Input device
6 UI
7 Field calculator
8 Surface generator
9 Memory storage
15 Processor
50 Microscope
51 Microscope main body
52 Controller

What is claimed is:

1. An information processing device comprising:
an image processor which generates surface information from point cloud data generated on the basis of position information of a fluorescent substance contained in a sample, using a value of a first parameter of the surface information and a value of a second parameter of the surface information; and
a display controller which causes a display to display a surface image on the basis of the generated surface information, wherein
the image processor generates a plurality of pieces of the surface information of a plurality of combinations, respectively, of a plurality of values of the first parameter and a plurality of values of the second parameter, and
the display controller causes the display to display a plurality of surface images on the basis of the plurality of pieces of surface information, respectively, of the plurality of combinations.

2. The information processing device according to claim 1, wherein
the display controller causes the display to display the plurality of surface images in an arranged manner.

3. The information processing device according to claim 1, wherein
the display controller causes the display to display the surface image at a position corresponding to the value of each parameter where the vertical axis represents the values of the first parameter and the horizontal axis represents the values of the second parameter.

4. The information processing device according to claim 1, wherein
the display controller causes the display to display the plurality of surface images such that the plurality of values of the first parameter correspond to a row direction and such that the plurality of values of the second parameter correspond to a column direction.

5. The information processing device according to claim 1, wherein
the display controller causes the display to display the plurality of surface images such that the plurality of values of the first parameter correspond to a vertical axis direction and such that the plurality of values of the second parameter correspond to a horizontal axis direction.

6. The information processing device according to claim 1, wherein
the display controller
causes the display to display a setting screen to set the value of the first parameter and the value of the second parameter, and
displays, on the setting screen, the value of the first parameter and the value of the second parameter corresponding to a surface image selected from the plurality of surface images displayed on the display.

7. The information processing device according to claim 1, wherein
the image processor
calculates a scalar field, applying a predetermined function in a region within a predetermined distance from each point data of the point cloud data, discretizes a scalar field at a grid point, and calculates the surface information, calculating an isosurface of a scalar value of the grid point, and
the value of the first parameter and the value of the second parameter are any one of a value related to the size of the region, a value related to the resolution of the grid point, and a value of the isosurface.

8. A microscope comprising:
the information processing device according to claim 1;
an illumination optical system which irradiates an excitation light to excite the fluorescent substance contained in the sample;
an observation optical system which forms an image of light from the sample; and
an image capturer which captures the image formed by the observation optical system, wherein
the image processor
calculates the position information of the fluorescent substance on the basis of a result captured by the image capturer, and generates the point cloud data, using the calculated position information.

9. A microscope comprising:
the information processing device according to claim 1;
an optical system which irradiates activation light for activating a part of the fluorescent substance contained in the sample;
an illumination optical system which irradiates an excitation light to excite at least a part of the activated fluorescent substance;
an observation optical system which forms an image of light from the sample; and
an image capturer which captures the image formed by the observation optical system, wherein
the image processor
calculates the position information of the fluorescent substance on the basis of a result captured by the image capturer, and generates the point cloud data, using the calculated position information.

10. An information processing method for generating surface information from point cloud data generated on the basis of position information of a fluorescent substance contained in a sample, using a value of a first parameter of the surface information and a value of a second parameter of the surface information, and causing a display to display a surface image on the basis of the generated surface information, the information processing method comprising:
generating a plurality of pieces of the surface information of a plurality of combinations, respectively, of a plurality of values of the first parameter and a plurality of values of the second parameter; and
causing the display to display a plurality of surface images on the basis of the plurality of pieces of surface information, respectively, of the plurality of combinations.

11. A non-transitory computer-readable tangible medium containing an information processing program which causes a computer to execute processes of:
- generating surface information from point cloud data generated on the basis of position information of a fluorescent substance contained in a sample, using a value of a first parameter of the surface information and a value of a second parameter of the surface information, and causing a display to display a surface image on the basis of the generated surface information, the information processing program causing the computer to execute:
- generating a plurality of pieces of the surface information of a plurality of combinations, respectively, of a plurality of values of the first parameter and a plurality of values of the second parameter; and
- causing the display to display a plurality of surface images on the basis of the plurality of pieces of surface information, respectively, of the plurality of combinations.

* * * * *